United States Patent
Huang et al.

(10) Patent No.: US 11,659,448 B2
(45) Date of Patent: May 23, 2023

(54) BASIC SERVICE SET (BSS) CONFIGURATION IN A MULTIPLE ACCESS POINT (MULTI-AP) NETWORK

(71) Applicant: QUALCOMM Incorporated, San Diego, CA (US)

(72) Inventors: Xiaolong Huang, San Jose, CA (US); Srinivas Katar, Fremont, CA (US); Bharat Bhushan, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 17/079,247

(22) Filed: Oct. 23, 2020

(65) Prior Publication Data

US 2021/0127307 A1    Apr. 29, 2021

Related U.S. Application Data

(60) Provisional application No. 62/925,226, filed on Oct. 23, 2019.

(51) Int. Cl.
| | | |
|---|---|---|
| *H04W 28/24* | (2009.01) | |
| *H04W 74/08* | (2009.01) | |
| *H04W 92/12* | (2009.01) | |
| *H04W 88/08* | (2009.01) | |

(Continued)

(52) U.S. Cl.
CPC ....... *H04W 28/24* (2013.01); *H04W 74/0816* (2013.01); *H04W 84/12* (2013.01); *H04W 88/08* (2013.01); *H04W 88/12* (2013.01); *H04W 92/12* (2013.01)

(58) Field of Classification Search
CPC . H04W 28/24; H04W 74/0816; H04W 84/12; H04W 88/08; H04W 88/12; H04W 92/12
See application file for complete search history.

(56) References Cited

U.S. PATENT DOCUMENTS

| | | | |
|---|---|---|---|
| 2014/0140211 A1* | 5/2014 | Chandrasekaran | ......................... H04W 28/0268 370/235 |
| 2014/0198723 A1* | 7/2014 | Gong | .................. H04W 74/006 370/328 |
| 2017/0048715 A1* | 2/2017 | Fan | ........................ H04L 45/507 |

(Continued)

*Primary Examiner* — Chi H Pham
*Assistant Examiner* — Weibin Huang
(74) *Attorney, Agent, or Firm* — Arun Swain; Holland & Hart LLP

(57) ABSTRACT

This disclosure provides methods, devices and systems for controlling basic service set (BSS) configuration of an access point (AP) in a multi-AP network. The multi-AP network may include a first AP that manages a first basic service set (BSS) and a second AP that manages a second BSS. The first BSS and the second BSS may share one or more wireless channels or may have overlapping coverage areas. A multi-AP controller may determine a BSS configuration policy (such as a maximum transmission opportunity (TXOP) duration) for the second BSS based on a type of traffic in the first BSS. This disclosure includes techniques for sharing traffic characteristics, determining the BSS configuration policy, communicating the BSS configuration policy, and controlling the BSS configuration policies for multiple BSSs so that one of the BSSs can provide a quality of service (QoS) for one or more stations (STAs).

30 Claims, 16 Drawing Sheets

(51) Int. Cl.
*H04W 88/12* (2009.01)
*H04W 84/12* (2009.01)

(56) References Cited

U.S. PATENT DOCUMENTS

| | | | | |
|---|---|---|---|---|
| 2018/0279130 A1* | 9/2018 | Huang | | H04W 24/02 |
| 2018/0279192 A1* | 9/2018 | Raissinia | | H04W 28/0804 |
| 2018/0302832 A1* | 10/2018 | Huang | | H04L 45/121 |
| 2019/0313254 A1* | 10/2019 | Zaks | | H04W 48/06 |
| 2021/0076369 A1* | 3/2021 | Nakahira | | H04W 72/082 |
| 2021/0385778 A1* | 12/2021 | Ahn | | H04W 48/08 |
| 2022/0086098 A1* | 3/2022 | Huang | | H04L 47/2441 |

* cited by examiner

1400

1410 — RECEIVE TRAFFIC CLASSIFICATION INFORMATION ASSOCIATED WITH COMMUNICATIONS BETWEEN A FIRST ACCESS POINT (AP) OF A MULTI-AP NETWORK AND ONE OR MORE WIRELESS STATIONS (STAS) IN A FIRST BASIC SERVICE SET (BSS) MANAGED BY THE FIRST AP

1420 — DETERMINE A BSS CONFIGURATION POLICY FOR A SECOND BSS MANAGED BY A SECOND AP OF THE MULTI-AP NETWORK BASED ON THE TRAFFIC CLASSIFICATION INFORMATION

1430 — TRANSMIT, TO THE SECOND AP, A FIRST MESSAGE THAT INDICATES THE BSS CONFIGURATION POLICY

*FIGURE 14*

BASIC SERVICE SET (BSS) CONFIGURATION IN A MULTIPLE ACCESS POINT (MULTI-AP) NETWORK

CROSS-REFERENCE TO RELATED APPLICATIONS

This Patent Application claims priority to U.S. Provisional Patent Application No. 62/925,226 filed Oct. 23, 2019, entitled "TRANSMISSION OPPORTUNITY DURATION CONTROL FOR A MULTIPLE ACCESS POINT (MULTI-AP) NETWORK," and assigned to the assignee hereof. The disclosure of the prior Application is considered part of and is incorporated by reference in this Patent Application.

TECHNICAL FIELD

This disclosure relates generally to wireless communication, and more specifically, to controlling a configuration of an access point in a wireless network that includes multiple access points.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN. A STA may have a wireless connection (referred to as a wireless association, or just "association") when it has authenticated and established a wireless session with the AP. One or more STAs in the WLAN may utilize the shared wireless communication medium to communicate with the AP and vice versa.

As more WLANs are deployed in an environment, the wireless medium may be shared by multiple APs and their respective BSSs. For example, a first BSS managed by a first AP and including multiple associated STAs may utilize a first wireless channel. A second BSS managed by a second AP and including multiple other associated STAs also may utilize the first wireless channel for separate communications unrelated to the first BSS. It is desirable to coordinate utilization of the first wireless channel so that the first AP and the second AP can support the throughput and latency requirements of their respective BSSs.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method may be performed by a wireless communication device of a multi-AP controller. The method may include receiving traffic classification information associated with communications between a first access point (AP) of a multi-AP network and one or more wireless stations (STAs) in a first basic service set (BSS) managed by the first AP. The method may include determining a BSS configuration policy for a second BSS managed by a second AP of the multi-AP network based on the traffic classification information. The method may include transmitting, to the second AP, a first message that indicates the BSS configuration policy.

In some implementations, the method may include determining a type of traffic being transmitted or received by the one or more STAs in the first BBS based on the traffic classification information. The method may include determining the BSS configuration policy based on the type of traffic.

In some implementations, the method may include determining that the first BSS and the second BSS utilize a same wireless channel. Determining the BSS configuration policy may include selecting a maximum transmission opportunity (TXOP) duration for the BSS configuration policy based on the traffic classification information for the one or more STAs in the first BSS. The maximum TXOP duration may limit an amount of time that the second BSS is permitted to utilize the wireless channel after winning a contention for the wireless channel.

In some implementations, the method may include receiving one or more neighbor AP report messages from a plurality of APs of the multi-AP network. The method may include determining that the first BSS and the second BSS are neighboring BSSs based on the one or more neighbor AP report messages. The method may include determining the BSS configuration policy when the first BSS and second BSs are neighboring BSSs.

In some implementations, the method may include determining a quantity of neighboring BSSs, including the first BSS and the second BSS, that have co-channel interference based on the one or more neighbor AP report messages. The method may include determining the BSS configuration policy based on the quantity of neighboring BSSs.

In some implementations, the method may include determining an amount of co-channel interference between that the first BSS and the second BSS based on the one or more neighbor AP report messages. The method may include determining the BSS configuration policy based on the amount of co-channel interference.

In some implementations, determining the amount of co-channel interference includes receiving, from the first AP, a received signal strength indication (RSSI) that indicates a signal strength of the second AP as measured by the first AP and determining the amount of co-channel interference based on the RSSI.

In some implementations, the method may include determining whether the amount of co-channel interference is above a co-channel interference threshold. The method may include determining the BSS configuration policy for the second BSS when the amount of co-channel interference is above the co-channel interference threshold.

In some implementations, the traffic classification information includes a latency quality-of-service (QoS) requirement, a traffic type, a service identifier, a traffic timing pattern, a user-configurable QoS setting, a network-configurable QoS setting, or any combination thereof.

In some implementations, determining the BSS configuration policy for the second BSS includes determining one or more quality of service (QoS) parameters for the one or more STAs in the first BSS based on the traffic classification information. The method may include determining the BSS configuration policy for the second BSS based on the one or more QoS parameters for the one or more STAs in the first BSS. The BSS configuration policy may limit the amount of time that the second BSS is permitted to utilize the wireless channel before the second BSS has to contend for access to the wireless channel such that the first BSS has an opportunity to win a subsequent contention for the wireless channel to satisfy the one or more QoS parameters.

In some implementations, the one or more QoS parameters include a latency value, and wherein the BSS configuration policy includes a maximum transmission opportunity (TXOP) duration for the second BSS based on the latency value.

In some implementations, the maximum TXOP duration for the BSS configuration policy of the second BSS may be a first value when the type of traffic of the one or more STAs in the first BSS includes one or more of voice over internet protocol (VoIP) traffic, video conferencing traffic, or gaming traffic. The maximum TXOP duration may be a second value when the type of traffic is internet video streaming traffic.

In some implementations, determining the BSS configuration policy for the second BSS based on the traffic classification information for the one or more STAs in the first BSS includes adapting one or more settings of the BSS configuration policy using a machine learning algorithm that balances airtime for the first BSS and the second BSS based on traffic classification information associated with the first BSS and the second BSS, respectively.

In some implementations, the method may include determining that a third AP manages a third BSS that is part of a multi-hop wireless path between the one or more STAs in the first BSS and another device. The method may include transmitting a second message that indicates a BSS configuration policy for the third BSS.

In some implementations, transmitting the BSS configuration policy to the second AP causes the second AP to set one or more contention-based access parameters of a BSS configuration for the second BSS based on the BSS configuration policy.

In some implementations, the multi-AP controller is included in, or part of, an AP of the multi-AP network.

In some implementations, the method includes managing BSS configuration policies for the plurality of APs of the multi-AP network in accordance with a multi-AP protocol specification that defines a control relationship between the multi-AP controller and respective multi-AP protocol agents in each of the plurality of APs.

In some implementations, the first message is formatted as an Institute of Electrical and Electronics Engineers (IEEE) 1905 message structured to include the BSS configuration policy in accordance with a multi-AP protocol specification.

Another innovative aspect of the subject matter described in this disclosure can be implemented in a method performed by a first AP. The method may include receiving a first message that indicates a BSS configuration policy for a first BSS managed by the first AP, wherein the BSS configuration policy is based, at least in part, on traffic classification information associated with communications between one or more STAs in a second BSS managed by a second AP of the multi-AP network. The method may include setting a BSS configuration setting for the first BSS based on the BSS configuration policy indicated in the first message.

In some implementations, the BSS configuration policy indicates a maximum transmission opportunity (TXOP) duration. The maximum TXOP duration may limit an amount of time that the first AP or one or more STAs in the first BSS is permitted to utilize the wireless channel after winning a contention for the wireless channel.

In some implementations, the method may include controlling an amount of time that the first AP or one or more STAs in the first BSS utilize the wireless channel after winning a contention for the wireless channel based on the maximum TXOP duration configuration setting.

In some implementations, the method may include implementing a multi-AP protocol agent in accordance with a multi-AP protocol specification that defines a control relationship between the multi-AP protocol agent and a multi-AP controller of the multi-AP network. The first message may be received from the multi-AP controller.

In some implementations, the method may include receiving, from the second AP, traffic classification information related to one or more STAs in the second BSS. The method may include selecting a BSS configuration setting for the first BSS based on the BSS configuration policy and the traffic classification information for the one or more STAs in the second BSS. The method may include controlling an amount of time that the first AP or one or more STAs of the first BSS utilize the wireless channel after winning a contention for the wireless channel based on the BSS configuration setting.

In some implementations, the method may include determining an amount of co-channel interference between that the first BSS and the second BSS. The method may include selecting the BSS configuration setting for the first BSS based on a determination that the amount of co-channel interference is above a co-channel interference threshold.

Another innovative aspect of the subject matter described in this disclosure can be implemented in a wireless communication device of a multiple access point (multi-AP) controller. The wireless communication device may include at least one modem and at least one processor. The at least one modem may be configured to receive traffic classification information associated with communications between a first access point (AP) of a multi-AP network and one or more wireless stations (STAs) in a first basic service set (BSS) managed by the first AP. The processor may be configured to determine a BSS configuration policy for a second BSS managed by a second AP of the multi-AP network based on the traffic classification information. The at least one modem may be configured to transmit a first message to the second AP that indicates the BSS configuration policy.

In some implementations, the processor may be configured to determine that the first BSS and the second BSS utilize a same wireless channel. In some implementations, the processor may be configured to select a transmission opportunity (TXOP) duration for the BSS configuration policy based on the traffic classification information for the first STA in the first BSS. The TXOP duration may limit an amount of time that the second BSS is permitted to utilize the wireless channel after winning a contention for the wireless channel.

In some implementations, the at least one modem may be configured to receive one or more neighbor AP report messages from the plurality of APs. The processor may be configured to determine an amount of co-channel interference between that the first BSS and the second BSS based on the one or more neighbor AP report messages. In some implementations, the processor may be configured to determine the BSS configuration policy for the second BSS when the amount of co-channel interference is above the co-channel interference threshold.

Another innovative aspect of the subject matter described in this disclosure can be implemented in an apparatus of a first access point (AP). The apparatus may include at least one modem and at least one processor. The at least one modem may be configured to receive a first message that indicates a basic service set (BSS) configuration policy for a first BSS managed by the first AP, wherein the BSS configuration policy is based, at least in part, on traffic classification information associated with communications between one or more stations (STAs) in a second BSS managed by a second AP of the multi-AP network. The processor may be configured to set a BSS configuration setting for the first BSS based on the BSS configuration policy indicated in the first message.

In some implementations, the BSS configuration policy includes a maximum transmission opportunity (TXOP) duration. The maximum TXOP duration may limit an amount of time that the first BSS is permitted to utilize the wireless channel after winning a contention for the wireless channel.

In some implementations, the apparatus further includes at least one transceiver coupled to the at least one modem and at least one antenna coupled to the at least one transceiver to wirelessly transmit signals output from the at least one transceiver and to wirelessly receive signals for input into the at least one transceiver. The apparatus may include a housing that encompasses the at least one modem, the at least one processor, the at least one transceiver and at least a portion of the at least one antenna.

Another innovative aspect of the subject matter described in this disclosure can be implemented in a wireless communication device that includes at least one modem, at least one processor communicatively coupled with the at least one modem, and at least one memory communicatively coupled with the at least one processor. The at least one memory may store processor-readable code that, when executed by the at least one processor in conjunction with the at least one modem, is configured to perform any of the above-mentioned methods.

Another innovative aspect of the subject matter described in this disclosure can be implemented in an apparatus that includes the above-mentioned wireless communication device, at least one transceiver coupled to the at least one modem, a plurality of antennas coupled to the at least one transceiver to wirelessly transmit signals output from the at least one transceiver, and a housing that encompasses the at least one modem, the at least one processor, the at least one memory, the at least one transceiver and at least a portion of the plurality of antennas.

Another innovative aspect of the subject matter described in this disclosure can be implemented in a system that includes means for performing the any of the above-mentioned methods.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 14 shows a flowchart illustrating an example process for setting a BSS configuration policy according to some implementations.

Like reference numbers and designations in the various drawings indicate like elements.

DETAILED DESCRIPTION

Figure 1:
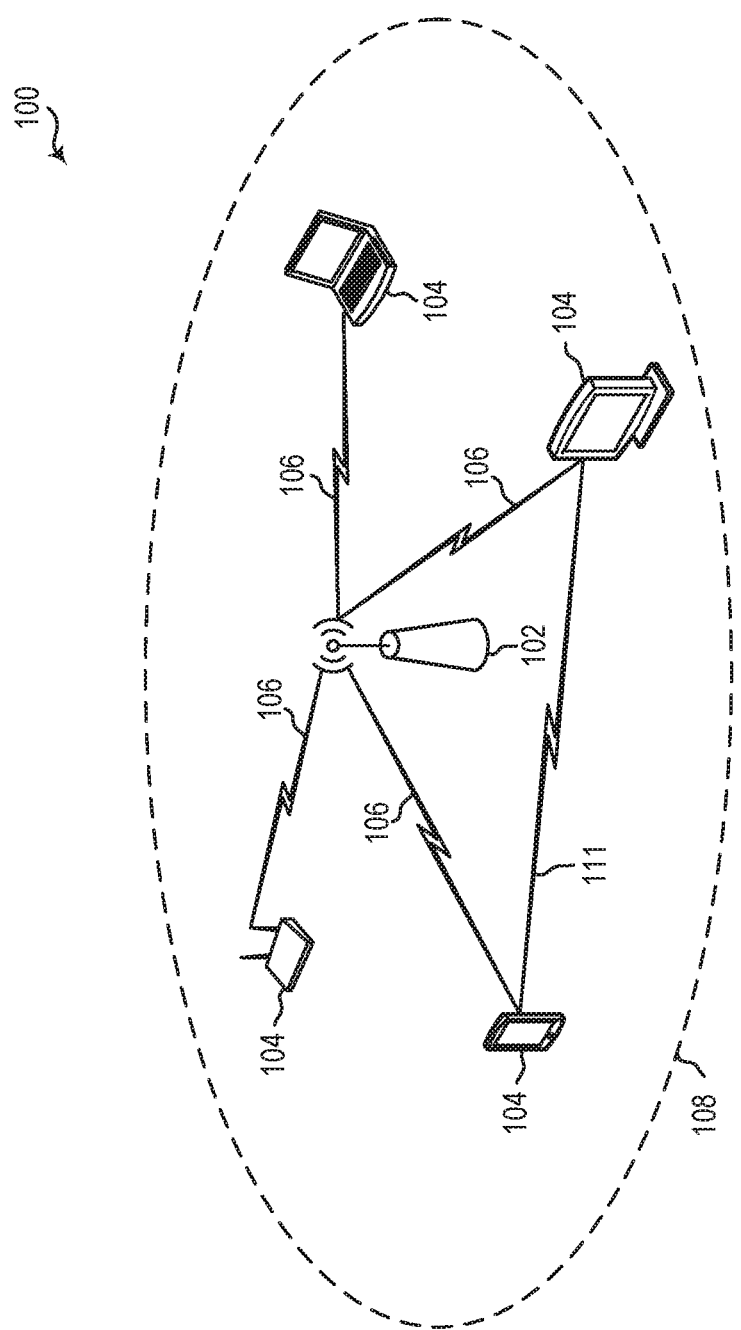
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

A wireless local area network (WLAN, sometimes also referred to as a Wi-Fi™ network) in a home, apartment, business, or other area may include one or more WLAN devices. An access point (AP) is a WLAN device that includes a distribution system access function. The AP may provide distribution system access for one or more stations (STAs) that are associated with the AP. In some deployments, an AP may enable access to a wired network via a network gateway (such as a bridge, router, or switch). The basic building block of a WLAN is a Basic Service Set (BSS), which is managed by an AP and includes one or more STAs associated with the AP. An AP may provide a wireless coverage area for devices to access the WLAN via a wireless channel. STAs can establish a wireless association (also referred to as a wireless link, wireless connection, or the like) via the channel configuration of an AP to access the WLAN. As more APs are deployed in an environment, the available frequency spectrum may become saturated. For example, there are a limited quantity of channels within each frequency band due to spectrum constraints. As the quantity of APs deployed in an area increases, it may become necessary for multiple APs (and their respective BSSs) to utilize a same wireless channel or channels. Multiple BSSs that utilize a same wireless channel in an overlapping coverage area may be said to share the wireless channel. When multiple BSSs are sharing the same channel, each BSS may generate co-channel interference that impacts another BSS that is using the same channel in an overlapping coverage area. Co-channel interference can severely affect the performance of a wireless network.

Various aspects relate generally to controlling a BSS configuration policy for one or more APs of a multi-AP network. In some aspects, a multi-AP controller of the multi-AP network may determine a BSS configuration policy for one or more APs of the network based on traffic classification information from one or more other APs that neighbor the respective APs. For example, the BSS configuration policy may include various Enhanced Distributed Channel Access (EDCA) parameters for an AP and STAs associated with that AP. In some implementations, the multi-AP controller may receive traffic classification information from one or more APs indicating latency-sensitive traffic. The multi-AP controller may determine EDCA parameters (or other BSS configuration parameters) for one or more other APs that utilize a same frequency spectrum and wireless coverage area so the wireless channel is available for the latency-sensitive traffic. In some implementations, the multi-AP controller may configure an AP with a BSS configuration policy that limits a transmission opportunity (TXOP) duration so that the wireless channel may be more available to other APs. A TXOP duration creates a limited period of time that an AP or a STA of each BSS can utilize a wireless channel after winning a contention-based access procedure such that the wireless channel becomes available for contention-based access again after the TXOP duration. A multi-AP controller may limit a TXOP duration setting (by setting a maximum TXOP duration) of one or more BSSs to support traffic requirements of one or more other BSSs. In some implementations, the multi-AP controller may indicate the BSS configuration policy in an IEEE 1905 message to that AP. The format of the IEEE 1905 message may be specified by a technical standard for multi-AP networks. An AP that implements the technical standard may be required to configure its BSS in accordance with the BSS configuration policy. Alternatively, or additionally, each AP of a multi-AP network may determine its own BSS configuration policy based on traffic classification information received from one or more other APs.

In some implementations, a communication from a STA may traverse a multi-hop wireless path that includes multiple BSSs between the STA and another wireless destination or a network gateway of the wireless network. The multi-AP controller may determine which BSSs produce co-channel interference for any wireless link in a multi-hop wireless path between a STA and the wireless destination or the network gateway. The multi-AP controller may determine BSS configuration policies for the BSSs in the multi-hop wireless path based on co-channel interference and traffic classification information.

Particular implementations of the subject matter described in this disclosure can be implemented to realize one or more of the following potential advantages. In some implementations, the described techniques can be used to support quality of service (QoS) requirements for various types of traffic including latency-sensitive traffic. For example, some types of traffic (such as voice over internet protocol (VoIP), video conferencing, gaming, or other traffic, among other examples) may be associated with a maximum end-to-end latency between a STA and another device. A BSS configuration policy (such as a TXOP duration limit) of one or more co-channel interfering BSSs may be controlled such that a wireless channel is more likely to be available for a BSS that has traffic with QoS requirements. Thus, the QoS requirements (such as a maximum latency) for a STA in one BSS may be supported by setting the BSS configuration policies of one or more other BSS.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11 ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 111. Additionally, two STAs 104 may communicate via a direct communication link 111 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 111 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11 ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it must wait for a particular time and then contend for access to the wireless medium. In some implementations, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a network allocation vector (NAV), an indicator of a time when the medium may next become idle. The NAV is reset each time a valid frame is received that is not addressed to the wireless communication device. The NAV effectively serves as a time duration that must elapse before the wireless communication device may contend for access even in the absence of a detected symbol or even if the detected energy is below the relevant threshold.

As described above, the DCF is implemented through the use of time intervals. These time intervals include the slot time (or "slot interval") and the inter-frame space (IFS). The slot time is the basic unit of timing and may be determined based on one or more of a transmit-receive turnaround time, a channel sensing time, a propagation delay and a MAC processing time. Measurements for channel sensing are performed for each slot. All transmissions may begin at slot boundaries. Different varieties of IFS exist including the short IFS (SIFS), the distributed IFS (DIFS), the extended IFS (EIFS), and the arbitration IFS (AIFS). For example, the DIFS may be defined as the sum of the SIFS and two times the slot time. The values for the slot time and IFS may be provided by a suitable standard specification, such as one of the IEEE 802.11 family of wireless communication protocol standards (such as that defined by the IEEE 802.11-2016 specification or amendments thereof including, but not limited to, 802.11ah, 802.11ad, 802.11 ay, 802.11ax, 802.11az, 802.11ba and 802.11be).

When the NAV reaches 0, the wireless communication device performs the physical carrier sensing. If the channel remains idle for the appropriate IFS (for example, the DIFS), the wireless communication device initiates a backoff timer, which represents a duration of time that the device must sense the medium to be idle before it is permitted to transmit. The backoff timer is decremented by one slot each time the medium is sensed to be idle during a corresponding slot interval. If the channel remains idle until the backoff timer expires, the wireless communication device becomes the holder (or "owner") of a transmission opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Each time the wireless communication devices generates a new PPDU for transmission in a new TXOP, it randomly selects a new backoff timer duration. The available distribution of the numbers that may be randomly selected for the backoff timer is referred to as the contention window (CW). If, when the backoff timer expires, the wireless communication device transmits the PPDU, but the medium is still busy, there may be a collision. Additionally, if there is otherwise too much energy on the wireless channel resulting in a poor signal-to-noise ratio (SNR), the communication may be corrupted or otherwise not successfully received. In such instances, the wireless communication device may not receive a communication acknowledging the transmitted PDU within a timeout interval. The MAC may then increase the CW exponentially, for example, doubling it, and randomly select a new backoff timer duration from the CW before each attempted retransmission of the PPDU. Before each attempted retransmission, the wireless communication device may wait a duration of DIFS and, if the medium remains idle, then proceed to initiate the new backoff timer. There are different CW and TXOP durations for each of the four access categories (ACs): voice (AC_VO), video (AC_VI), background (AC_BK), and best effort (AC_BE). This enables particular types of traffic to be prioritized in the network.

Figure 2:
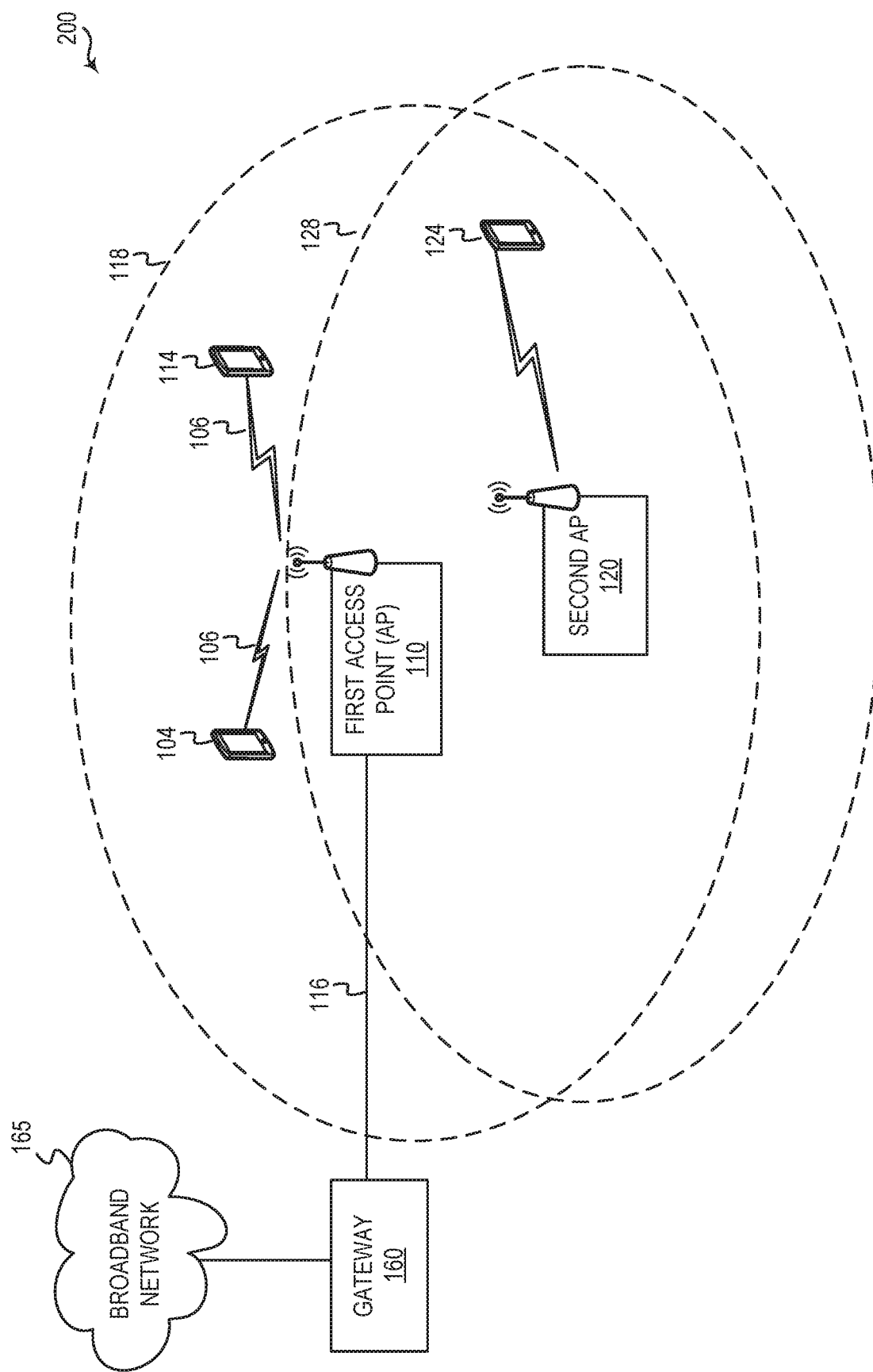
FIG. 2 shows a pictorial diagram of an example environment with multiple access points.

FIG. 2 shows a pictorial diagram of an example environment with multiple access points 200. A first BSS may be managed by a first AP 110. Similarly, a second BSS may be managed by a second AP 120. Each of the APs 110, 120 may be similar to the AP 102 described in FIG. 1. FIG. 2 additionally shows example coverage areas associated with each AP. For example, a first coverage area 118 of the AP 110 may represent a basic service area (BSA) of the first BSS. An example second coverage area 128 of the second AP 120 may form a BSA of the second BSS. Each BSS may be a network implementing at least one of the IEEE 802.11 family of standards (such as that defined by the IEEE 802.11-2016 specification or amendments thereof). Each AP may provide access to other networks. For example, the first AP 110 may have a communication link 116 to a gateway 160 that provides connectivity to another network 165. The communication link 116 may be a wireless or a wired connection. The second AP 120 may have a communication link (not shown) to the same gateway 160 or to another gateway (not shown). In some implementations, the second BSS managed by the second AP 120 may be referred to as an overlapping BSS (OBSS) in relation to the first BSS managed by the first AP 110. Each BSS may include numerous wireless communication devices such as an AP and a plurality of STAs. In this description, the first AP 110 is described as an access point using an infrastructure mode. However, in some implementations, the first AP 110 may be a STA which is operating as an AP. For example, the first AP 110 may be a STA capable of operating in a peer-to-peer mode or independent mode. In other examples, the first AP 110 may be a software AP (SoftAP) operating on a computer system.

In the example of FIG. 2, the first BSS includes the first AP 110 and a STAs 104 and 114. The second BSS includes the second AP 120 and a second STA 124. In the example of FIG. 2, the APs 110 and 120 may be configured to use a same wireless channel. For example, the first BSS and the second BSS may be referred to as neighboring BSSs because they are configured for the same wireless channel in the same location. Traditionally, the APs may share the wireless channel using either a time-based division of the wireless channel or by obtaining access through a contention-based procedure. In a contention-based procedure, the WLAN devices (such as the APs 110 and 120 or STAs 104, 114, and 124) may determine if the wireless channel is available and may win a contention for an upcoming TXOP. Following a traditional contention-based procedure, the TXOP would be exclusively reserved for the WLAN device that wins the contention for channel access. For example, the first AP 110 may win the contention for the next TXOP. The first AP 110 may be referred to as a TXOP owner. During the TXOP duration, other WLAN devices may refrain from transmitting or receiving traffic unless the TXOP owner allocates part of the TXOP for them. In the case of neighboring BSSs, this may cause a delay for the BSS that does not include the TXOP owner. Thus, in a multi-AP environment, a long TXOP duration in one BSS can negatively affect channel access and QoS for neighboring BSSs. For example, a long TXOP duration may increase latency and cause poor performance in transmitting and receiving latency sensitive traffic in neighboring BSSs.

Figure 3:
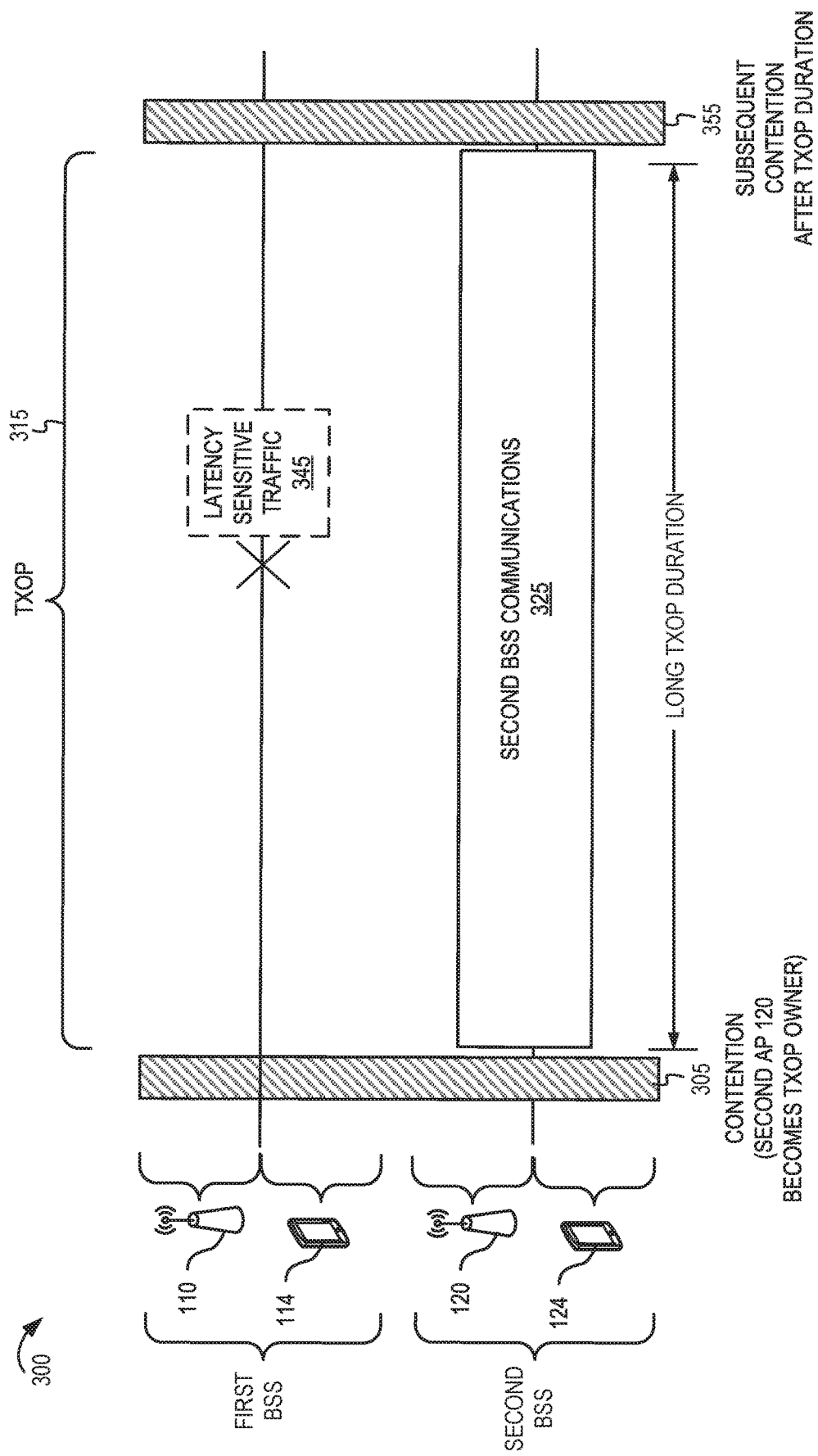
FIG. 3 shows a first timing diagram for a wireless channel shared by multiple access points in which a long transmission opportunity (TXOP) may impact quality of service (QoS) for a neighboring basic service set (BSS).

FIG. 3 shows a first timing diagram 300 for a wireless channel shared by multiple access points in which a long TXOP may impact QoS for a neighboring BSS. FIG. 3 includes the first AP 110 and first STA 114, which form a first BSS as described above with reference to FIG. 2. A second AP 120 and a second STA 124 form a second BSS. In the example of FIG. 3, the second AP 120 may win a contention 305 and become a TXOP owner for a TXOP 315. During the TXOP 315, the second AP 120 may transmit or receive second BSS communications 325. Meanwhile, the first BSS may remain idle until the end of the TXOP 315. However, the first BSS may have some latency sensitive traffic 345 that cannot be sent because the second BSS is utilizing the wireless channel. The TXOP duration may represent a maximum amount of time for which the second BSS has reserved the medium. The first AP 110 and the first STA 114 may not be able to contend for access to the wireless channel until the subsequent contention period 355 after the TXOP 315.

Figure 4:
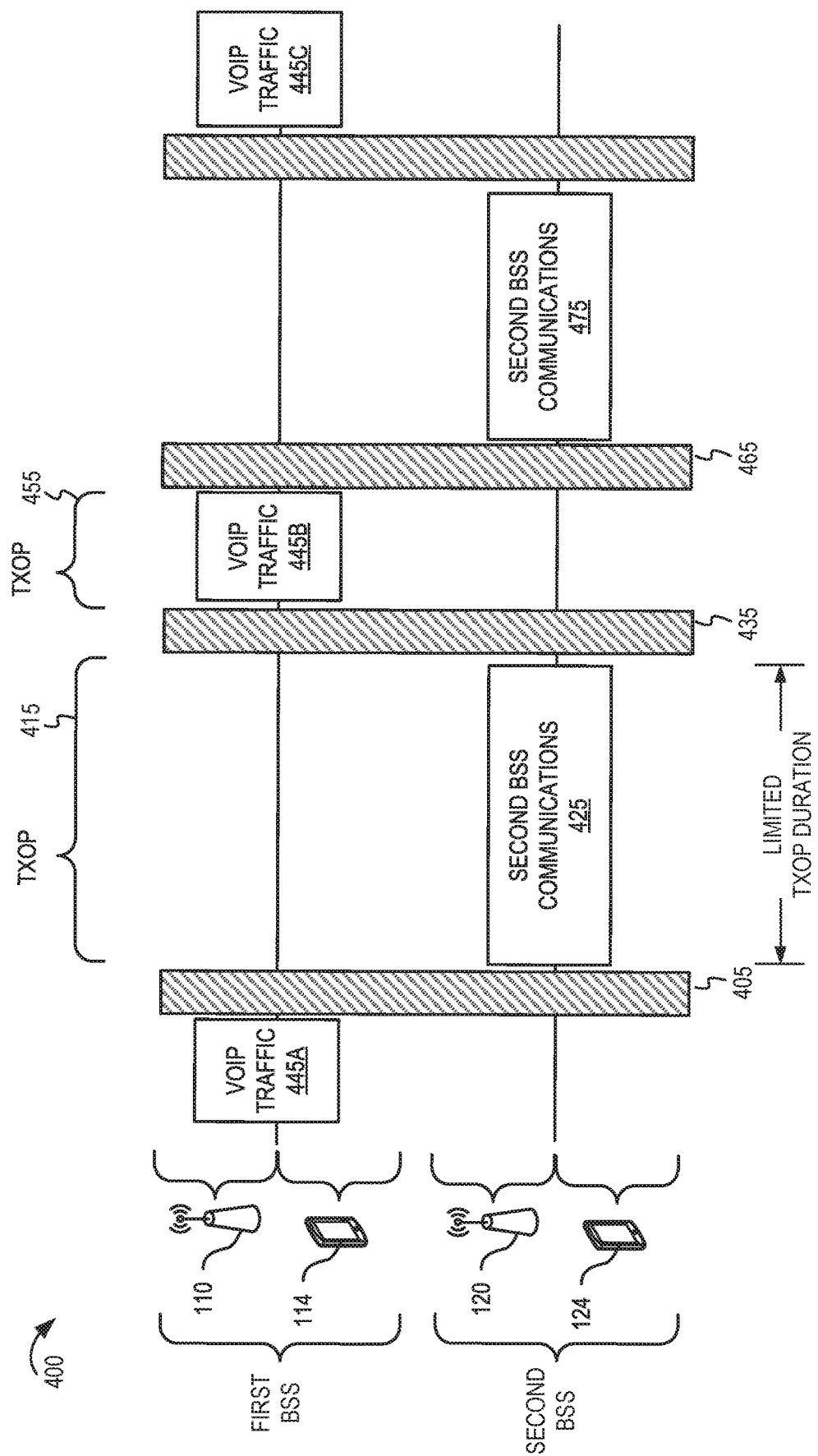
FIG. 4 shows a second timing diagram for a wireless channel shared by multiple access points in which a limited TXOP duration may improve QoS for the neighboring BSS according to some implementations.

FIG. 4 shows a second timing diagram 400 for a wireless channel shared by multiple access points in which a limited TXOP duration may improve QoS for the neighboring BSS according to some implementations. FIG. 4 includes the first AP 110, first STA 114, second AP 120, and second STA 124 as described above with reference to FIGS. 2 and 3. The first BSS (formed by the first AP 110 and the first STA 114) may have VoIP traffic 445A, 445B, and 445C which has a QoS latency requirement. Although the amount of transmission time is relatively small for each transmission, some types of traffic are sensitive to latency between each transmission. Each transmission may follow a successful contention for access to the wireless channel.

Following a first transmission of the VoIP traffic 445A in the first BSS, a second BSS (either the second AP 120 or the second STA 124) may win a contention 405 for the wireless channel. However, the TXOP 415 may have a limited TXOP duration so that a next contention 435 will occur sooner than the example in FIG. 3. The first BSS (either the first AP 110 or the first STA 114) may win the subsequent contention 435 and transmit a second transmission of the VoIP traffic 445B during the subsequent TXOP 455. The second BSS may continue utilizing the wireless channel for second BSS communications 475 following the next contention 465.

In some implementations, the first AP 110 and the second AP 120 may share traffic QoS requirements of their respective BSSs either with each other or with a multi-AP controller. A TXOP duration limit may be based on the traffic QoS requirements, the number of neighboring BSSs, or the amount of co-channel interference, among other examples. In some implementations, a multi-AP controller can coordinate TXOP duration limits for neighboring BSSs that may impact an end-to-end path from a client STA to a gateway or root AP.

Figure 5:
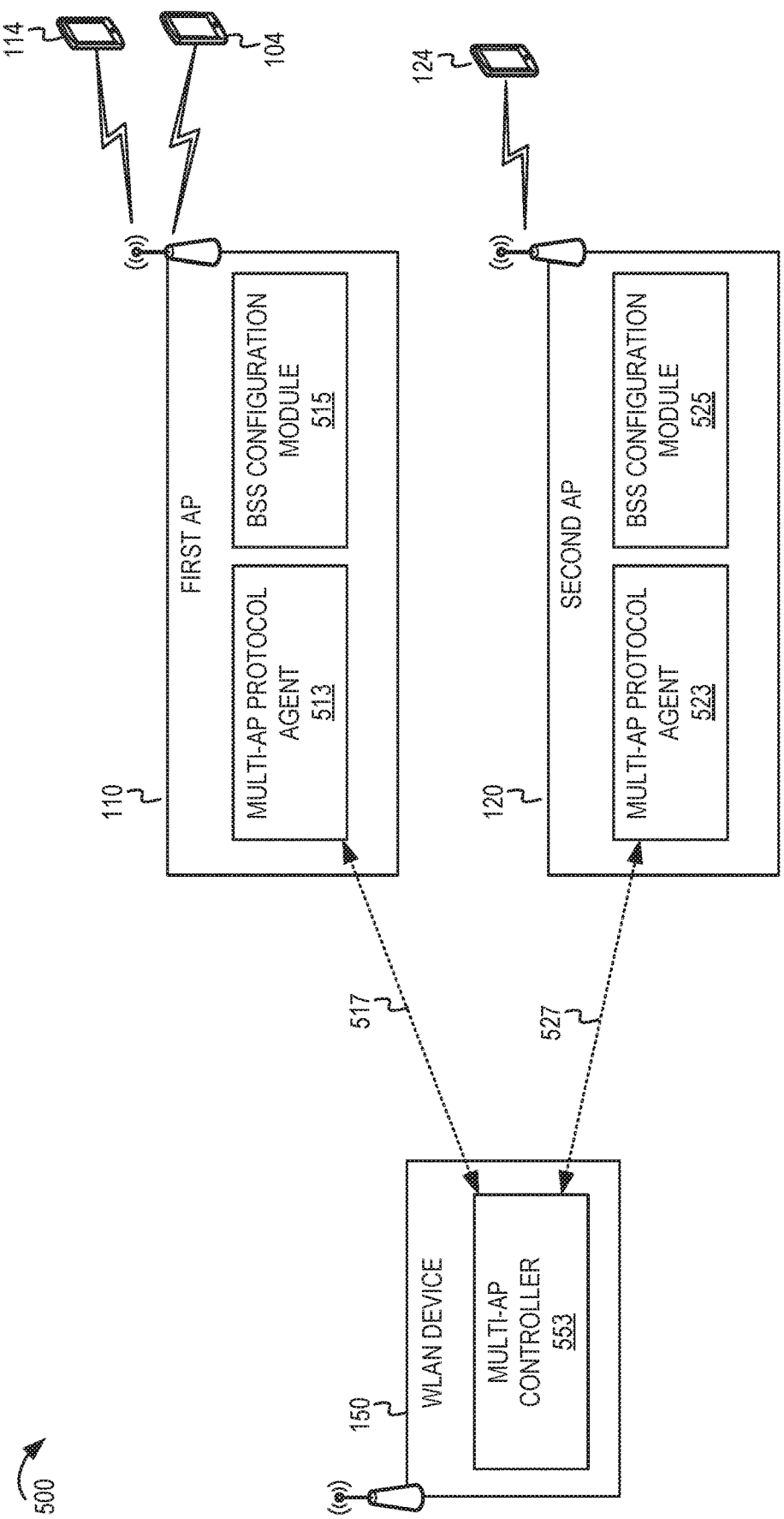
FIG. 5 shows a block diagram of a multi-AP control system according to some implementations.

FIG. 5 shows a block diagram 500 of a multi-AP control system according to some implementations. A WLAN device 150 may include a multi-AP controller 553. The multi-AP controller 553 may establish a first control relationship 517 with the first AP 110. While the multi-AP controller 553 is shown as being in the WLAN device 150, in some implementations, the multi-AP controller 553 may be included in the first AP 110 or the second AP 120. In some implementations, the WLAN device 150 may operate as an access point or other network element. In some implementations, the first AP 110 may include a multi-AP protocol agent 513 that implements a multi-AP protocol. The multi-AP protocol agent 513 may provide traffic classification information regarding one or more STAs 104, 114 associated with the first AP 110. The first AP 110 may include a BSS configuration module 515 that manages the first BSS. For example, the BSS configuration module 515 may establish settings (such as a TXOP duration limit) for the first AP 110 and the associated STAs 104 and 114.

The multi-AP controller 553 may establish a second control relationship 527 with the second AP 120. In some implementations, the second AP 120 may include a multi-AP protocol agent 523 that implements the multi-AP protocol. The multi-AP protocol agent 523 may provide traffic classification information regarding one or more STAs 124 associated with the second AP 120. The second AP 120 may include a BSS configuration module 525 that manages the second BSS. For example, the BSS configuration module 525 may establish settings (such as a TXOP duration limit) for the second AP 120 and the associated STAs 124.

The multi-AP controller 553 may identify different types of traffic and related QoS requirements for the first and second BSS based on the traffic classification information. In some implementations, the traffic classification information may include a latency value or other QoS parameter. Alternatively, or additionally, the traffic classification information may include service identifiers, packet timing patterns, user-configurable settings, network-configurable settings, or other information that can be used to determine a type of traffic or related QoS parameters. Examples of types of traffic may include VoIP, video conferencing, gaming, internet video streaming, hypertext transfer protocol (HTTP) data, email, and IoT sensor data, among other examples. Each type of traffic may have different values for a particular QoS parameter. For example, VoIP traffic may have a 75-millisecond maximum latency tolerance while video streaming may have a much larger latency tolerance (such as 6 seconds).

The multi-AP controller 553 may determine a TXOP duration limit that satisfies the QoS parameters for the current traffic pattern for the first and second BSS. For example, the multi-AP controller 553 may select a TXOP duration that will enable contention to the shared wireless channel before a maximum latency tolerance for traffic in the first BSS. The multi-AP controller 553 may transmit a control message to the multi-AP protocol agent 523 to instruct the second AP 120 to utilize the selected TXOP duration. The multi-AP protocol agent 523, in conjunction with the BSS configuration module 525, may set the TXOP duration limit for the second BSS managed by the second AP 120. For downlink transmissions (from the second AP 120 to the second STA 124), the second AP 120 may use the TXOP duration limit after the second AP 120 wins a contention for the wireless channel. If the second AP 120 implements triggered uplink transmissions (such that the second AP 120 controls when the second STA 124 can use the wireless channel), the second AP 120 can control access of the wireless channel for triggered uplink transmissions using the TXOP duration limit.

In some other aspect, for example, in the case of unscheduled uplink access (from the second STA 124 to the second AP 120), the second STA 124 may win contention to the wireless channel. Therefore, to enforce the TXOP duration limit, the BSS configuration module 525 may set a TXOP duration setting for the BSS and transmit the TXOP duration limit to the STAs 124 in the second BSS. For example, the second AP 120 may transmit a management frame (such as a Beacon frame) that indicates the TXOP duration limit for the second BSS.

Figure 6:
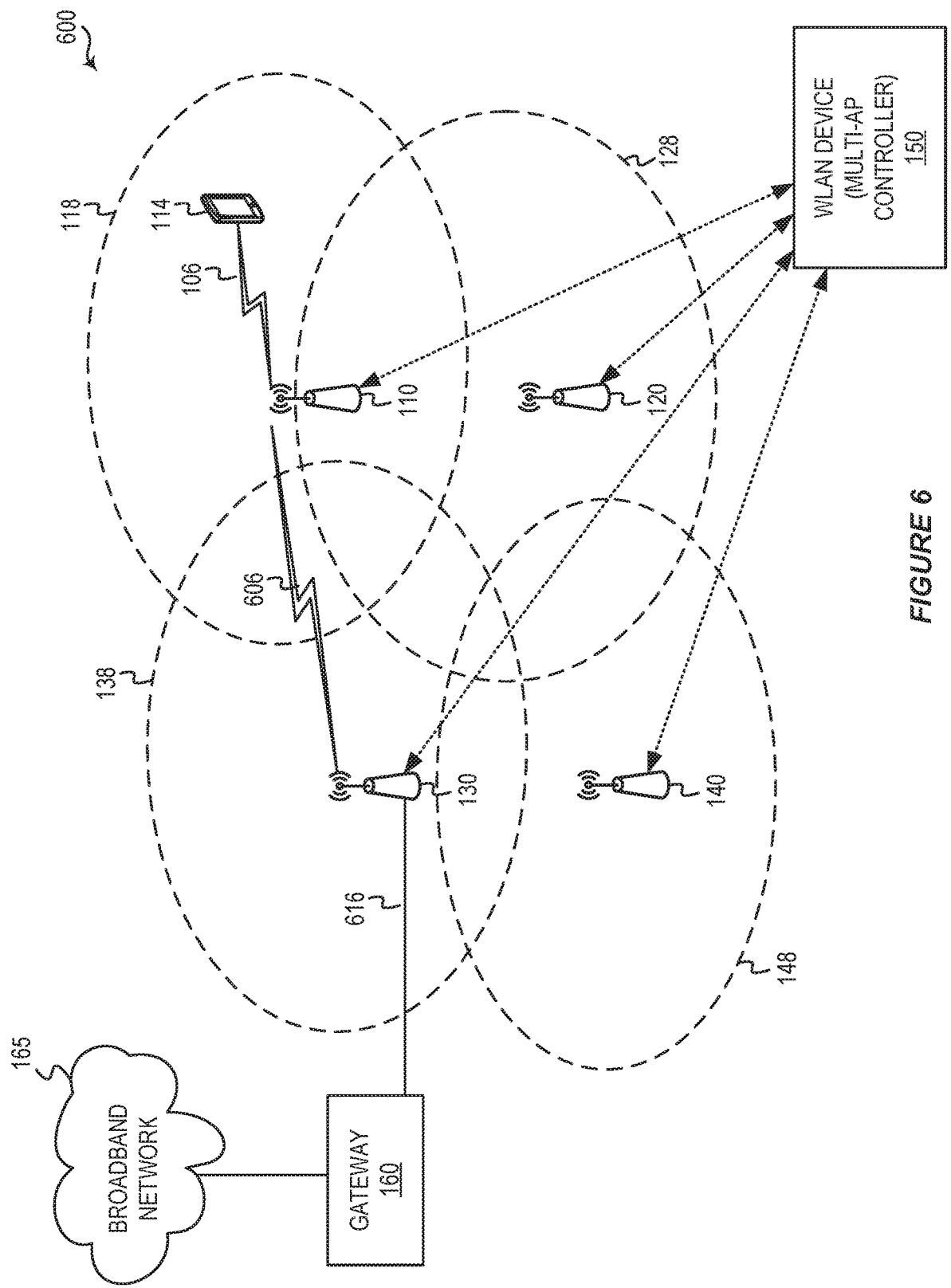
FIG. 6 shows a pictorial diagram of an example environment with multiple access points in which a multi-AP controller manages TXOP durations of interfering BSSs in a path from a client station to a gateway.

FIG. 6 shows a pictorial diagram of an example environment 600 with multiple access points in which a multi-AP controller manages TXOP durations of interfering BSSs in a path from a client station to a gateway. FIG. 6 shows a first AP 110, a second AP 120, a third AP 130, a fourth AP 140 and their respective coverage areas 118, 128, 138, and 148. A first STA 114 is associated with the first AP 110 that manages a first BSS. The example topology in FIG. 6 is provided for illustrative purposes. In the example topology shown in FIG. 6, the first AP 110 has a backhaul wireless communication link 606 to the third AP 130. The third AP 130 has a communication link 616 to a gateway 160 which provides access to another network 165.

The network connections for the second AP 120 and the third 130 AP are not depicted for purposes of illustrating the other aspects. In some implementations, the second AP 120 and the third AP 130 may connect to different networks (not shown) or may have wired or wireless communication links to the gateway 160, the third AP 130, or the first AP 110. The first AP 110 may share a wireless channel with the second AP 120. The first AP 110 and the second AP 120 may be neighboring BSSs as described with reference to FIGS. 2-4. Similarly, the third AP 130 and the fourth AP 140 may manage respective BSSs that are neighboring BSSs and that share a wireless channel. The wireless channel shared by the third AP 130 and the fourth AP 140 may be a different channel than that which is shared by the first AP 110 and the second AP 120.

The example environment and topology shown in FIG. 6 illustrates a scenario in which traffic type and path may impact a selection of TXOP durations. The first STA 114 may be transmitting latency sensitive traffic to the gateway 160 or receiving latency sensitive traffic from the gateway 160. The latency sensitive traffic may utilize a path between the gateway 160 and the first STA 114 that includes the communication link 616, the third AP 130, the backhaul wireless communication link 606, the first AP 110, and the communication link 106. While the first AP 110 may control airtime access for other devices (not shown) in the first BSS, a long delay anywhere in the path between the first STA 114 and the gateway 160 may negatively impact the end-to-end latency of the traffic. Thus, absent the techniques in this disclosure, the fourth AP 140 may impact the end-to-end quality of service for the path of the latency sensitive traffic. For example, the fourth AP 140 may win a contention for the wireless channel that is shared with the third AP 130 and may utilize the wireless channel for a long TXOP duration. While the fourth AP 140 utilizes the wireless channel, the third AP 130 may be prevented from gaining access to the wireless channel before a maximum latency tolerance for traffic transmitted to or received from the first AP has passed.

A multi-AP controller may use the techniques in this disclosure to facilitate end-to-end QoS for the traffic. As shown in FIG. 6, all of the APs 110, 120, 130, and 140 may have a control relationship with a WLAN device 150 that includes a multi-AP controller. The multi-AP controller may determine that the first AP 110 is communicating latency sensitive traffic to the first STA 114 or receiving latency sensitive traffic from the first STA 114. Each of the APs 110, 120, 130, and 140 may provide information regarding their BSS and neighboring BSS(s). In some implementations, the APs may transmit a neighbor BSS report or other message that indicates co-channel interference or RSSI information regarding neighboring BSSs. Examples of information that the multi-AP controller may collect include the presence of latency sensitive traffic in one or more BSSs, co-channel interference of neighboring BSSs, channel access latency parameters, and end-to-end latency requirements, among other examples. The multi-AP controller may select a TXOP duration limit that is lower than a tolerable latency of the latency sensitive traffic. The multi-AP controller may determine which BSSs are neighboring BSSs for any BSS along the path between the gateway 160 and the first STA 114. In the example environment in FIG. 6, the second AP 120 and the fourth AP 140 operate neighboring BSSs that may impact the end-to-end path of the latency sensitive traffic transmitted to or received from the first AP 110. The multi-AP controller may signal the TXOP duration limit to the second AP 120 and the fourth AP 140 to prevent those APs from holding their respective shared channels beyond a maximum latency tolerance of the traffic. The second AP 120 and the fourth AP 140 may signal the TXOP duration limit in their respective BSSs to inform any associated STAs (not shown) in their BSS of the TXOP duration limit.

Figure 7:
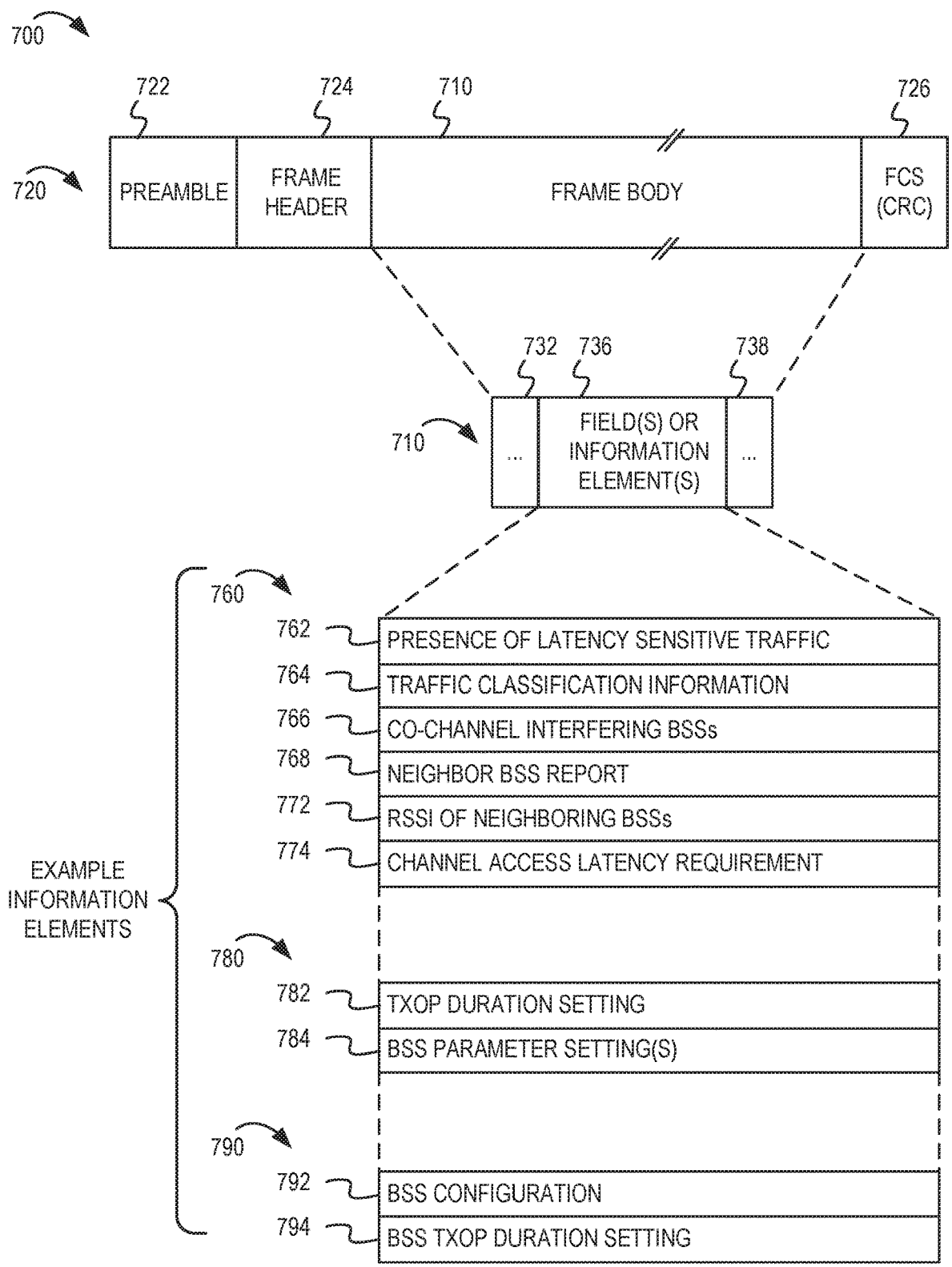
FIG. 7 depicts an example conceptual diagram of a multi-AP protocol message according to some implementations.

FIG. 7 depicts an example conceptual diagram of a multi-AP protocol message according to some implementations. For example, the message may be transmitted from the first AP to a second AP, from the second AP to the first AP, from either of the first AP or second AP to a multi-AP controller, or from a multi-AP controller to either of the first AP or the second AP. Several examples of the message are described based on the transmitter and the recipient of the message. This message format 700 may be used to communicate parameters that can be used to determine a normalized gain adjustment. FIG. 7 includes an example data frame 720. The data frame 720 may include a preamble 722, a frame header 724, a frame body 710, and a frame check sequence (FCS) 726. The preamble 722 may include one or more bits to establish synchronization. The frame header 724 may include source and destination network addresses (such as the network address of the transmitting AP and receiving AP, respectively), the length of data frame, or other frame control information. The frame body 710 may be organized with a message format and may include a variety of fields or information elements 732, 736 and 738. In some implementations, the data frame 720 may be a multi-AP protocol message, a management frame, an IEEE 1905 policy configuration message, or an IEEE 802.11k message, among other examples.

Example information elements are shown in FIG. 7. Some example information elements 760 may be included in a report message from an AP (or a multi-AP protocol agent of an AP). The example information elements 760 may include an indicator 762 that indicates the presence of latency sensitive traffic, traffic classification information 764, a list of co-channel interfering BSSs 766, a neighbor BSS report 772, or a channel access latency requirement 774, among other examples. Some example information elements 780 may be included in a control message from a multi-AP controller to an AP (or a multi-AP protocol agent of an AP). The example information elements 780 may include a TXOP duration setting 782 or a BSS parameter setting 784, among other examples. Some example information elements 780 may be included in a management message from an AP to one or more STAs associated with the BSS managed by the AP. The example information elements 790 may include a BSS configuration 792 or a BSS TXOP duration setting 794, among other examples.

Figure 8:
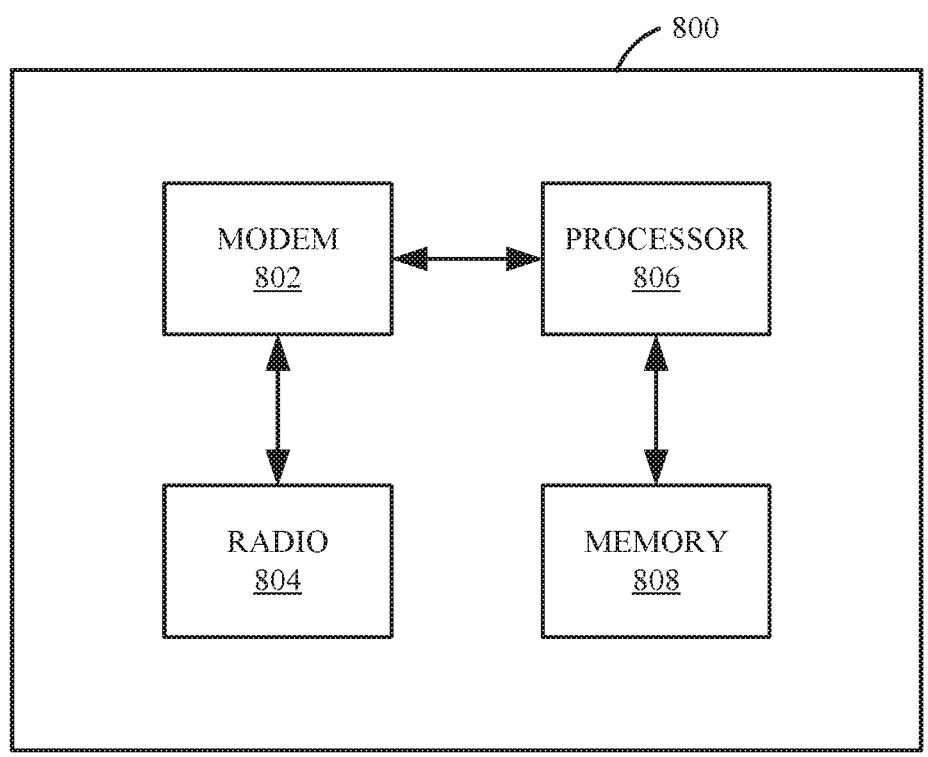
FIG. 8 shows a block diagram of an example wireless communication device.

FIG. 8 shows a block diagram of an example wireless communication device 800. In some implementations, the wireless communication device 800 can be an example of a device for use in a STA such as one of the STAs 104 described above with reference to FIG. 1. In some implementations, the wireless communication device 800 can be an example of a device for use in an AP such as the AP 102 described above with reference to FIG. 1. The wireless communication device 800 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 800 can be, or can include, a chip, system on chip (SoC), chipset, package or device that includes one or more modems 802, for example, a Wi-Fi (IEEE 802.11 compliant) modem. In some implementations, the one or more modems 802 (collectively "the modem 802") additionally include a WWAN modem (for example, a 3GPP 4G LTE or 5G compliant modem). In some implementations, the wireless communication device 800 also includes one or more radios 804 (collectively "the radio 804"). In some implementations, the wireless communication device 800 further includes one or more processors, processing blocks or processing elements 806 (collectively "the processor 806") and one or more memory blocks or elements 808 (collectively "the memory 808").

The modem 802 can include an intelligent hardware block or device such as, for example, an application-specific integrated circuit (ASIC) among other possibilities. The modem 802 is generally configured to implement a PHY layer. For example, the modem 802 is configured to modulate packets and to output the modulated packets to the radio 804 for transmission over the wireless medium. The modem 802 is similarly configured to obtain modulated packets received by the radio 804 and to demodulate the packets to provide demodulated packets. In addition to a modulator and a demodulator, the modem 802 may further include digital signal processing (DSP) circuitry, automatic gain control (AGC), a coder, a decoder, a multiplexer and a demultiplexer. For example, while in a transmission mode, data obtained from the processor 806 is provided to a coder, which encodes the data to provide encoded bits. The encoded bits are then mapped to points in a modulation constellation (using a selected MCS) to provide modulated symbols. The modulated symbols may then be mapped to a number NS S of spatial streams or a number NSTS of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 804. In implementations involving beamforming, the modulated symbols in the respective spatial streams are precoded via a steering matrix prior to their provision to the IFFT block.

While in a reception mode, digital signals received from the radio 804 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 806) for processing, evaluation or interpretation.

The radio 804 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 800 can include, or be coupled with, multiple transmit antennas (each with a corresponding transmit chain) and multiple receive antennas (each with a corresponding receive chain). The symbols output from the modem 802 are provided to the radio 804, which then transmits the symbols via the coupled antennas. Similarly, symbols received via the antennas are obtained by the radio 804, which then provides the symbols to the modem 802.

The processor 806 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 806 processes information received through the radio 804 and the modem 802, and processes information to be output through the modem 802 and the radio 804 for transmission through the wireless medium. For example, the processor 806 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 806 may generally control the modem 802 to cause the modem to perform various operations described above.

The memory 808 can include tangible storage media such as random-access memory (RAM) or read-only memory (ROM), or combinations thereof. The memory 808 also can store non-transitory processor- or computer-executable software (SW) code containing instructions that, when executed by the processor 806, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 9B:
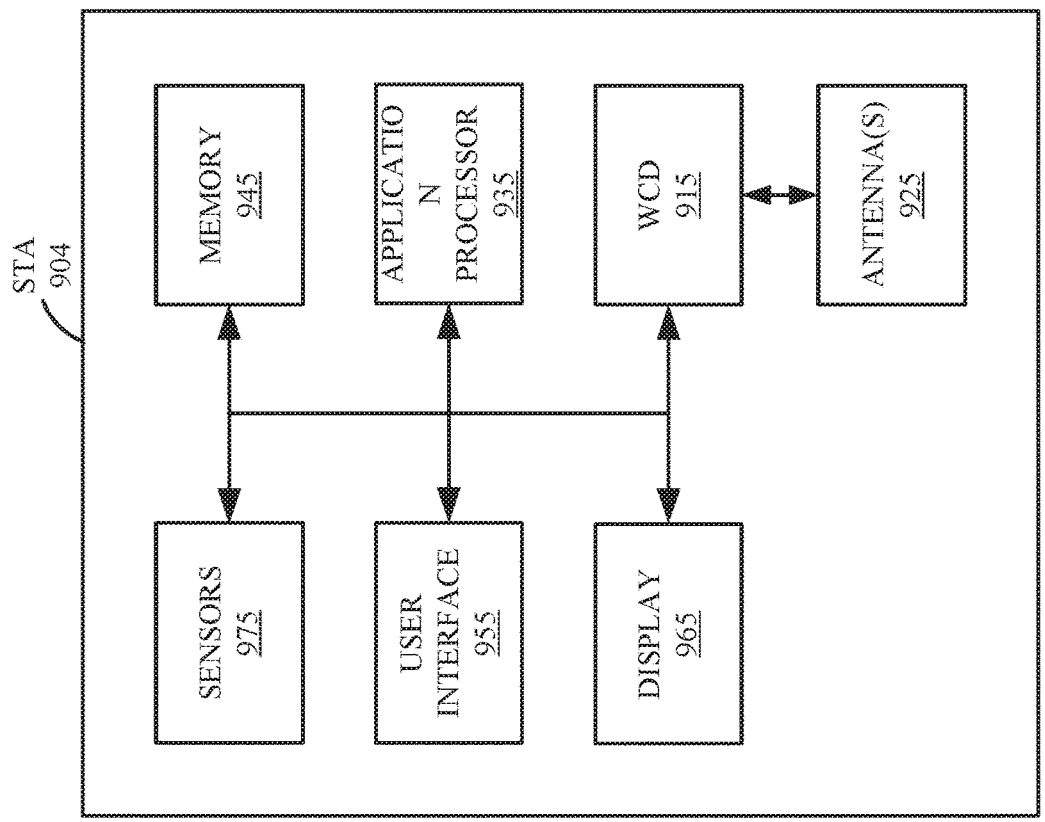
FIG. 9B shows a block diagram of an example station (STA).
Figure 9A:
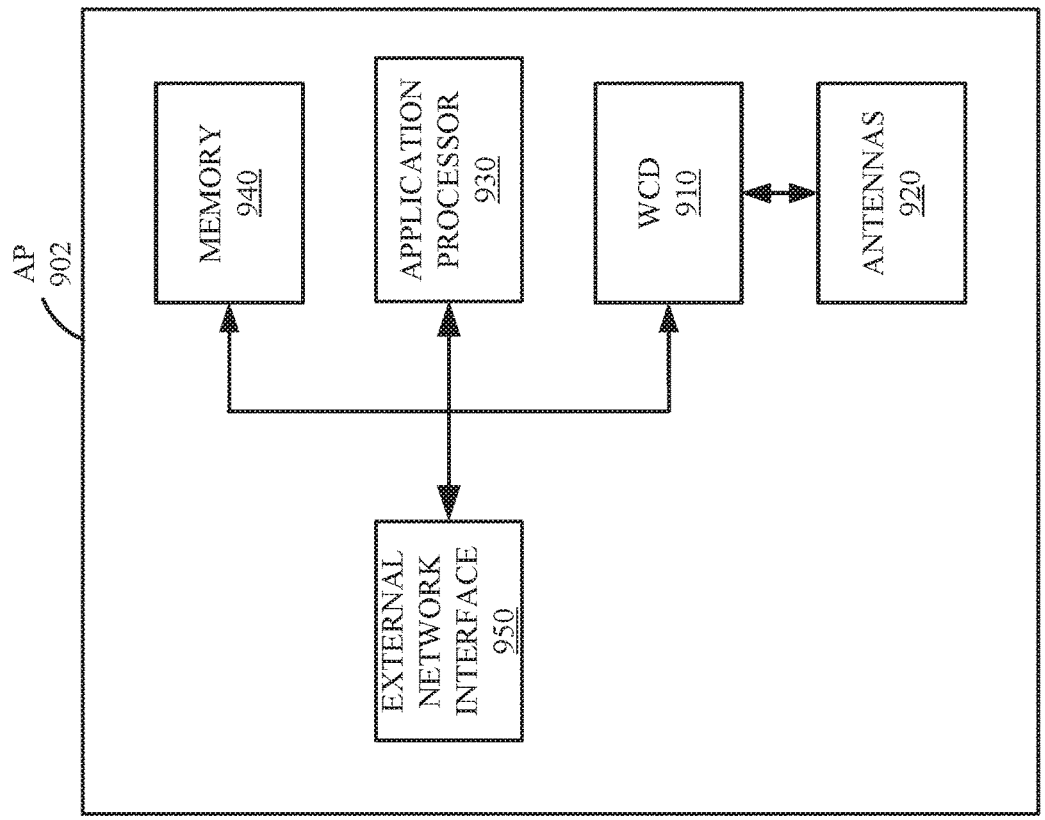
FIG. 9A shows a block diagram of an example access point (AP).

FIG. 9A shows a block diagram of an example AP 902. For example, the AP 902 can be an example implementation of the AP 102 described with reference to FIG. 1. The AP 902 includes a wireless communication device (WCD) 910 (although the AP 902 may itself also be referred to generally as a wireless communication device as used herein). For example, the wireless communication device 910 may be an example implementation of the wireless communication device 8000 described with reference to FIG. 8. The AP 902 also includes multiple antennas 920 coupled with the wireless communication device 910 to transmit and receive wireless communications. In some implementations, the AP 902 additionally includes an application processor 930 coupled with the wireless communication device 910, and a memory 940 coupled with the application processor 930. The AP 902 further includes at least one external network interface 950 that enables the AP 902 to communicate with a core network or backhaul network to gain access to external networks including the Internet. For example, the external network interface 950 may include one or both of a wired (for example, Ethernet) network interface and a wireless network interface (such as a WWAN interface). Ones of the aforementioned components can communicate with other ones of the components directly or indirectly, over at least one bus. The AP 902 further includes a housing that encompasses the wireless communication device 910, the application processor 930, the memory 940, and at least portions of the antennas 920 and external network interface 950.

FIG. 9B shows a block diagram of an example STA 904. For example, the STA 904 can be an example implementation of the STA 104 described with reference to FIG. 1. The STA 904 includes a wireless communication device 915 (although the STA 904 may itself also be referred to generally as a wireless communication device as used herein). For example, the wireless communication device 915 may be an example implementation of the wireless communication device 800 described with reference to FIG. 8. The STA 904 also includes one or more antennas 925 coupled with the wireless communication device 915 to transmit and receive wireless communications. The STA 904 additionally includes an application processor 935 coupled with the wireless communication device 915, and a memory 945 coupled with the application processor 935. In some implementations, the STA 904 further includes a user interface (UI) 955 (such as a touchscreen or keypad) and a display 965, which may be integrated with the UI 955 to form a touchscreen display. In some implementations, the STA 904 may further include one or more sensors 975 such as, for example, one or more inertial sensors, accelerometers, temperature sensors, pressure sensors, or altitude sensors. Ones of the aforementioned components can communicate with other ones of the components directly or indirectly, over at least one bus. The STA 904 further includes a housing that encompasses the wireless communication device 915, the application processor 935, the memory 945, and at least portions of the antennas 925, UI 955, and display 965.

As described above, a BSS may be communicating a type of traffic that has one or more QoS requirements. Neighboring BSSs may share a wireless channel with one or more BSSs that communicate the traffic. The neighboring BSSs may utilize the wireless channel for a time period referred to as a TXOP duration. Absent the techniques of this disclosure, the TXOP duration of a neighboring BSS may cause a BSS having latency-sensitive traffic to exceed a latency tolerance associated with the traffic.

Various implementations relate generally to controlling a BSS configuration policy for one or more APs of a multi-AP network. For example, the BSS configuration policy may include a TXOP duration limit for a neighboring AP on the wireless channel. A multi-AP controller of the multi-AP network may determine the BSS configuration policy for one AP based on traffic classification information from another AP. In some implementations, the BSS configuration policy includes a selected TXOP duration to support quality of service (QoS) for traffic of neighboring BSSs. Some implementations more specifically relate to a multi-AP controller that selects the BSS configuration policy based on traffic classification information received from one or more neighboring APs. Alternatively, or additionally, each AP of a multi-AP network may determine a BSS configuration policy based on traffic classification information received from a neighboring AP. In some implementations, the multi-AP controller may determine which BSSs produce co-channel interference for any wireless link in any path between a client STA and a gateway device. In some implementations, the multi-AP controller may determine a latency value associated with traffic transmitted to or received from a client STA in a first BSS that has co-channel interfering BSSs. The multi-AP controller may select the TXOP duration for the co-channel interfering BSSs based on the latency value. The selected TXOP duration may be set to a value that supports the latency requirements of the traffic transmitted to or received from the client STA of the first BSS. Furthermore, the multi-AP controller can manage QoS for traffic at a plurality of APs by setting TXOP duration limits at multiple BSSs based on network topology, traffic type, and congestion, among other examples.

Particular implementations of the subject matter described in this disclosure can be implemented to realize one or more of the following potential advantages. In some implementations, the described techniques can be used to support QoS for various types of traffic. For example, latency sensitive traffic (such as voice over internet protocol (VoIP), video conferencing, gaming, among other examples) may be associated with a maximum end to end latency between a client STA and a gateway. A client STA may successfully transmit or receive the latency sensitive traffic as a result of limiting the TXOP duration used by co-channel interfering BSSs.

Figure 10:
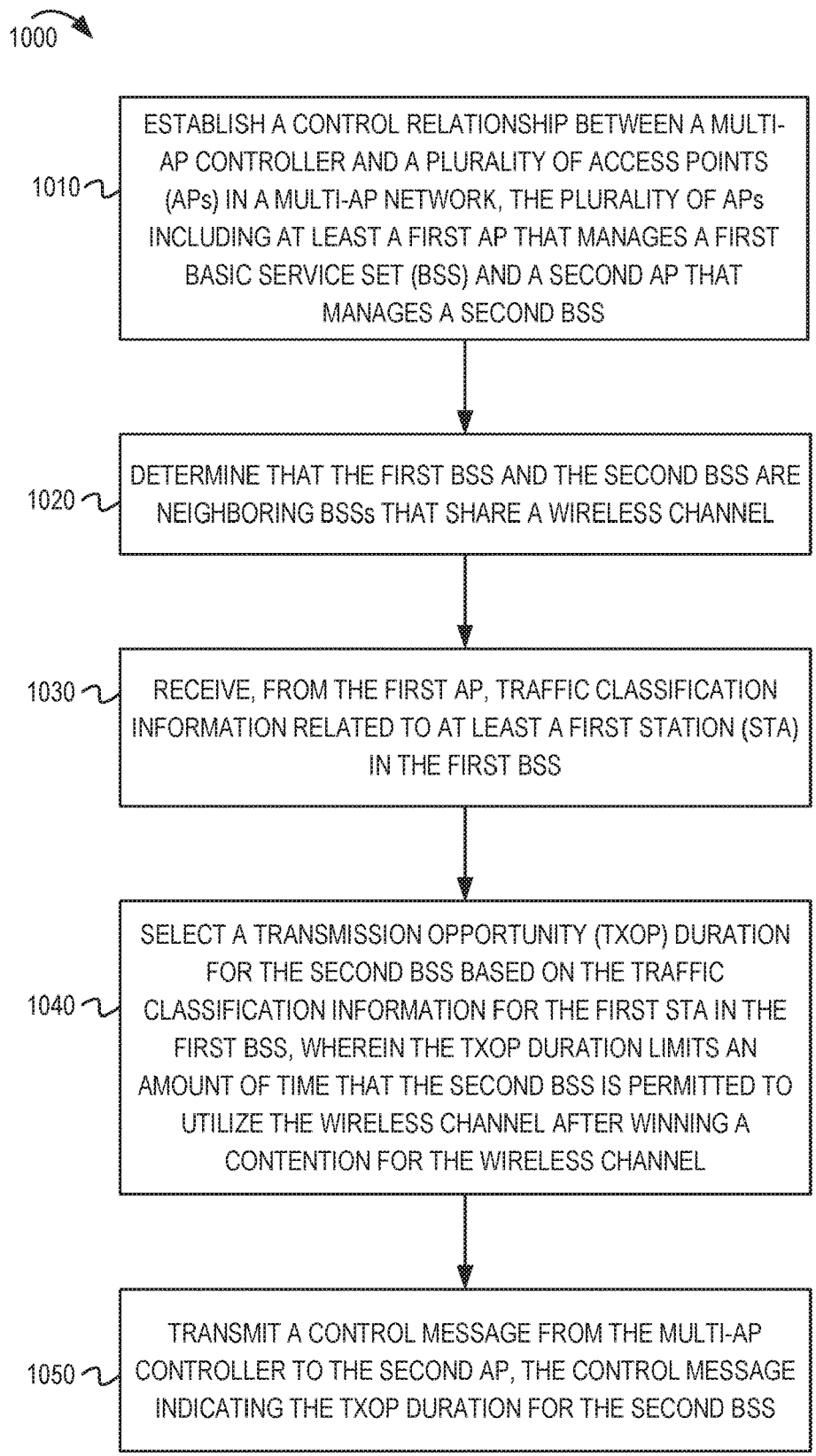
FIG. 10 shows a flowchart illustrating an example process for setting a TXOP duration of a neighboring BSS according to some implementations.

FIG. 10 shows a flowchart illustrating an example process 1000 for setting a TXOP duration of a neighboring BSS according to some implementations. The operations of process 1000 may be implemented by a multi-AP controller as described herein. For example, the process 1000 may be performed by a wireless communication device such as the wireless communication device 800 described above with reference to FIG. 8. In some implementations, the process 1000 may be performed by a WLAN device that includes a multi-AP controller, such as the WLAN device 150 described above with reference to FIGS. 5 and 6.

In some implementations, in block 1010, the wireless communication device may establish a control relationship between the multi-AP controller and a plurality of access points (APs) in a multi-AP network. The plurality of APs may include at least a first AP that manages a first basic service set (BSS) and a second AP that manages a second BSS.

In block 1020, the wireless communication device may determine that the first BSS and the second BSS are neighboring BSSs that share a wireless channel.

In block 1030, the wireless communication device may receive, from the first AP, traffic classification information related to at least a first station (STA) in the first BSS.

In block 1040, the wireless communication device may select a transmission opportunity (TXOP) duration for the second BSS based on the traffic classification information for the first STA in the first BSS. The TXOP duration limits an amount of time that the second BSS is permitted to utilize the wireless channel after winning a contention for the wireless channel.

In block 1050, the wireless communication device may transmit a control message from the multi-AP controller to the second AP, the control message indicating the TXOP duration for the second BSS.

Figure 11:
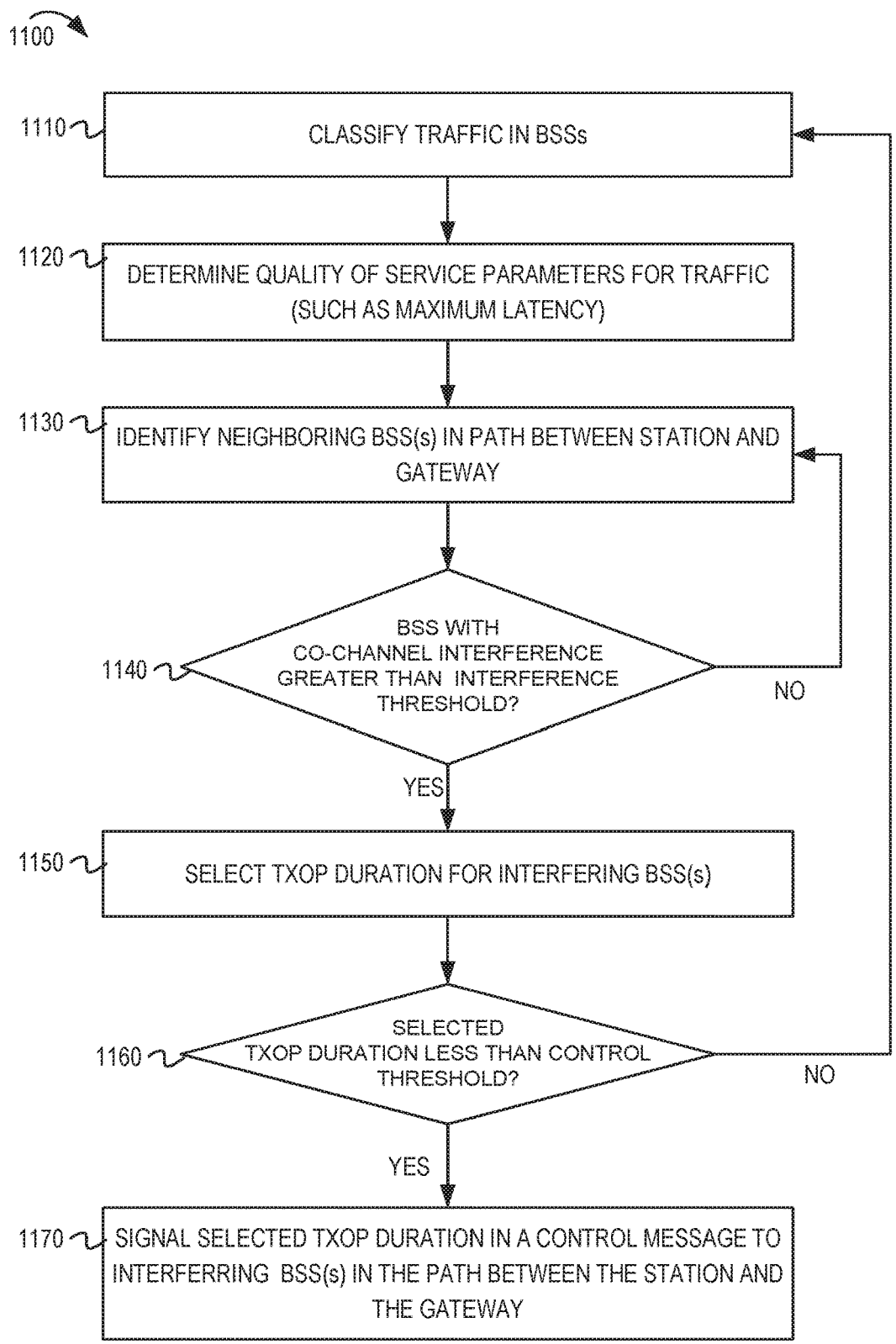
FIG. 11 shows a flowchart illustrating an example process for supporting QoS using TXOP duration according to some implementations.

FIG. 11 shows a flowchart illustrating an example process 1100 for supporting QoS using TXOP duration according to some implementations. The process 1100 may be performed by a wireless communication device such as the wireless communication device 800 described above with reference to FIG. 8. In some implementations, the process 1100 may be performed by a wireless communication device that has a multi-AP controller. In some implementations, the process 1100 may be performed by a wireless communication device operating as or within an AP, such as one of the APs 102, 110, 120, 130, 140 and 902 described above with reference to FIGS. 1-6 and 9A. For example, the process 1100 may be an example implementation of the process 1000 described with reference to FIG. 10.

In some implementations, in block 1110, the wireless communication device may classify the traffic in one or more BSSs in a multi-AP network. For example, the wireless communication device may process traffic classification information received from one or more BSSs. In some implementations, the wireless communication device may use a heuristic rule matching module or a machine learning traffic classifier to determine a type of traffic being communicated by the BSSs.

In some implementations, in block 1120, the wireless communication device may determine QoS parameters for each type of classified traffic. For example, the wireless communication device may determine a maximum latency value for the traffic. As examples, the latency value may be 75 milliseconds when the type of traffic is VoIP traffic, video conferencing traffic, or gaming traffic. The latency value may be longer (such as 6 seconds) when the type of traffic is internet video streaming traffic.

In some implementations, in block 1130, the wireless communication device may identify one or more neighboring BSSs that are neighbors to BSSs in a path between a station and a gateway. The neighboring BSSs may include BSSs that share wireless channels with any of the BSSs that carry the type of classified traffic.

In some implementations, in block 1140, the wireless communication device may determine if the co-channel interference is greater than an interference threshold. If the co-channel interference is not greater than an interference threshold, then the neighboring BSS is disregarded as a potential candidate to have its TXOP duration limited and the flow returns to block 1130. If the co-channel interference is greater than the interference threshold, the flow continues to block 1150.

In some implementations, in block 1150, the wireless communication device may select a TXOP duration for the interfering BSSs. The TXOP duration may be calculated based on the quantity of neighboring BSSs that have co-channel interference above the interference threshold. The TXOP duration is selected based on the maximum latency value associated with the type of traffic. In some implementations, the TXOP duration limit may be selected based on a lookup table, specified in a technical specification, or calculated using a formula, among other examples. Equation 1 shows an example calculation for selecting the TXOP duration limit, where Latency Max is the maximum latency tolerance, $N_{neighborBSSs}$ is the number of neighboring BSSs that share the same wireless channel, and X is a fixed value (such as 4, in some implementations).

$$TXOP\ duration\ limit = \frac{Latency\_Max}{N_{neighbor\ BSSs} * X} \quad (1)$$

Other calculations may be possible. For example, in some implementations, the calculation for TXOP duration limit may take into account the quantity of legacy STAs associated with the neighboring BSSs.

In some implementations, in block 1160, the wireless communication device may determine if the selected TXOP duration is less than a control threshold. For example, the wireless communication device may determine if the calculated TXOP duration limit is below a 10 millisecond (ms) threshold to determine whether it is necessary to signal the TXOP duration to the interfering BSSs. If the calculated TXOP duration limit is above the control threshold, the flow may return to block 1110 to classify the next type of traffic. If the calculated TXOP duration limit is below the control threshold, the flow may proceed to block 1170.

In some implementations, in block 1170, the wireless communication device may signal the calculated TXOP duration limit in a control message to the APs that manage the interfering BSSs in the path between the station and the gateway. Upon receiving the control message, the APs may set their TXOP duration setting based on the instruction in the control message. The APs may also signal the TXOP duration setting to associated clients in their respective BSSs. For example, the APs may include the TXOP duration setting in a TXOP limit field in an EDCA parameter set element in a Beacon message.

The TXOP duration limit may be signaled using a variety of indicator or metrics. For example, the TXOP duration limit may be a value that represents a number of microseconds (µs) or milliseconds (ms). In some implementations, the TXOP duration limit may be divided by a fixed value to reduce a size of the field that carries the TXOP duration limit. A receiving BSS may multiple the field by the fixed value to determine the TXOP duration limit. In some implementations, the field that carries the TXOP duration limit may include a lookup value that represents different predetermined TXOP duration limits.

Figure 12:
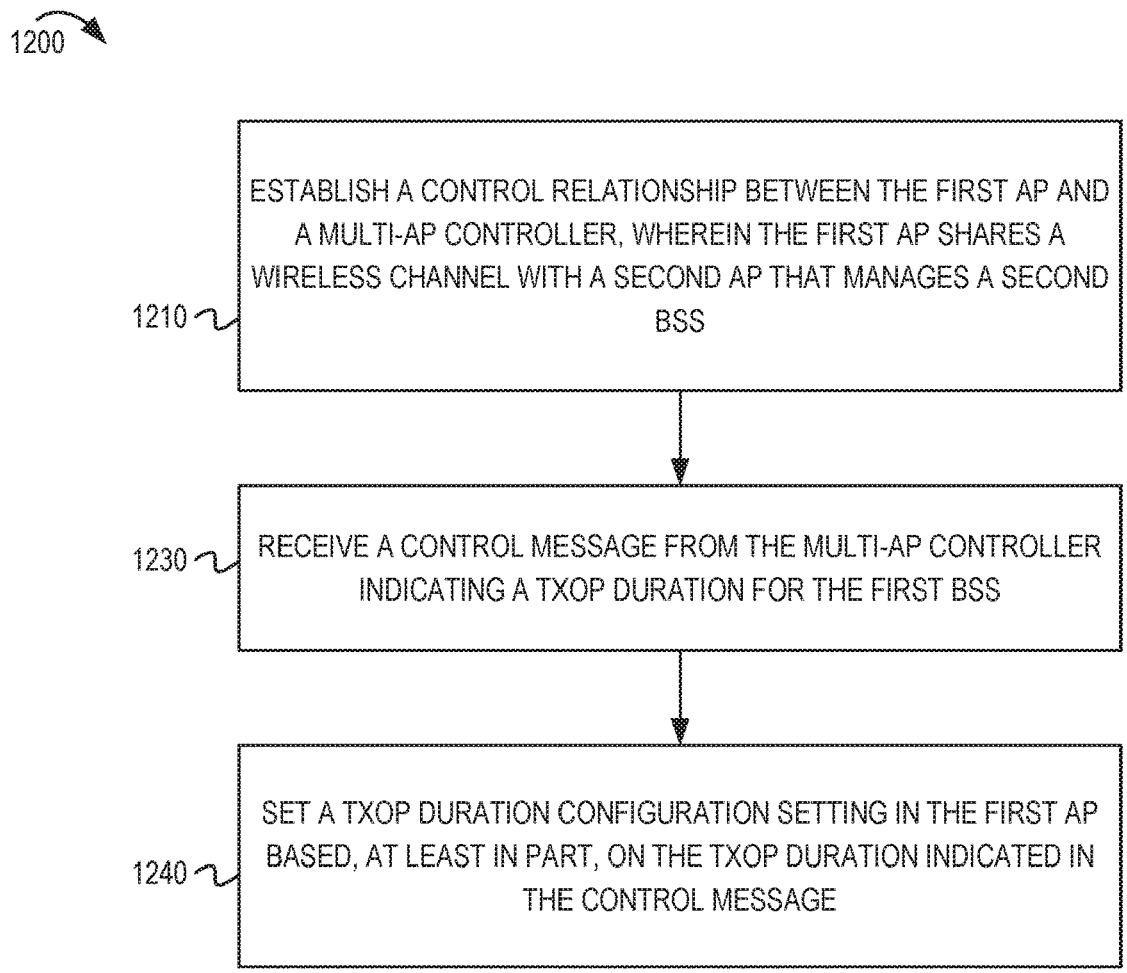
FIG. 12 shows a flowchart illustrating an example process for implementing a TXOP duration according to some implementations.

FIG. 12 shows a flowchart illustrating an example process 1200 for implementing a TXOP duration according to some implementations. The process 1200 may be performed by a wireless communication device such as the wireless communication device 800 described above with reference to FIG. 8. In some implementations, the process 1200 may be performed by a wireless communication device operating as or within an AP, such as one of the APs 102, 110, 120, 130, 140 and 902 described above with reference to FIGS. 1-6 and 9A.

In some implementations, in block 1210, the wireless communication device may establish a control relationship between the first AP and a multi-AP controller. The first AP shares a wireless channel with a second AP that manages a second BSS.

In some implementations, in block 1230, the wireless communication device may receive a control message from the multi-AP controller indicating a TXOP duration for the first BSS.

In some implementations, in block 1240, the wireless communication device may set a TXOP duration configuration setting in the first AP based, at least in part, on the TXOP duration indicated in the control message.

Figure 13:
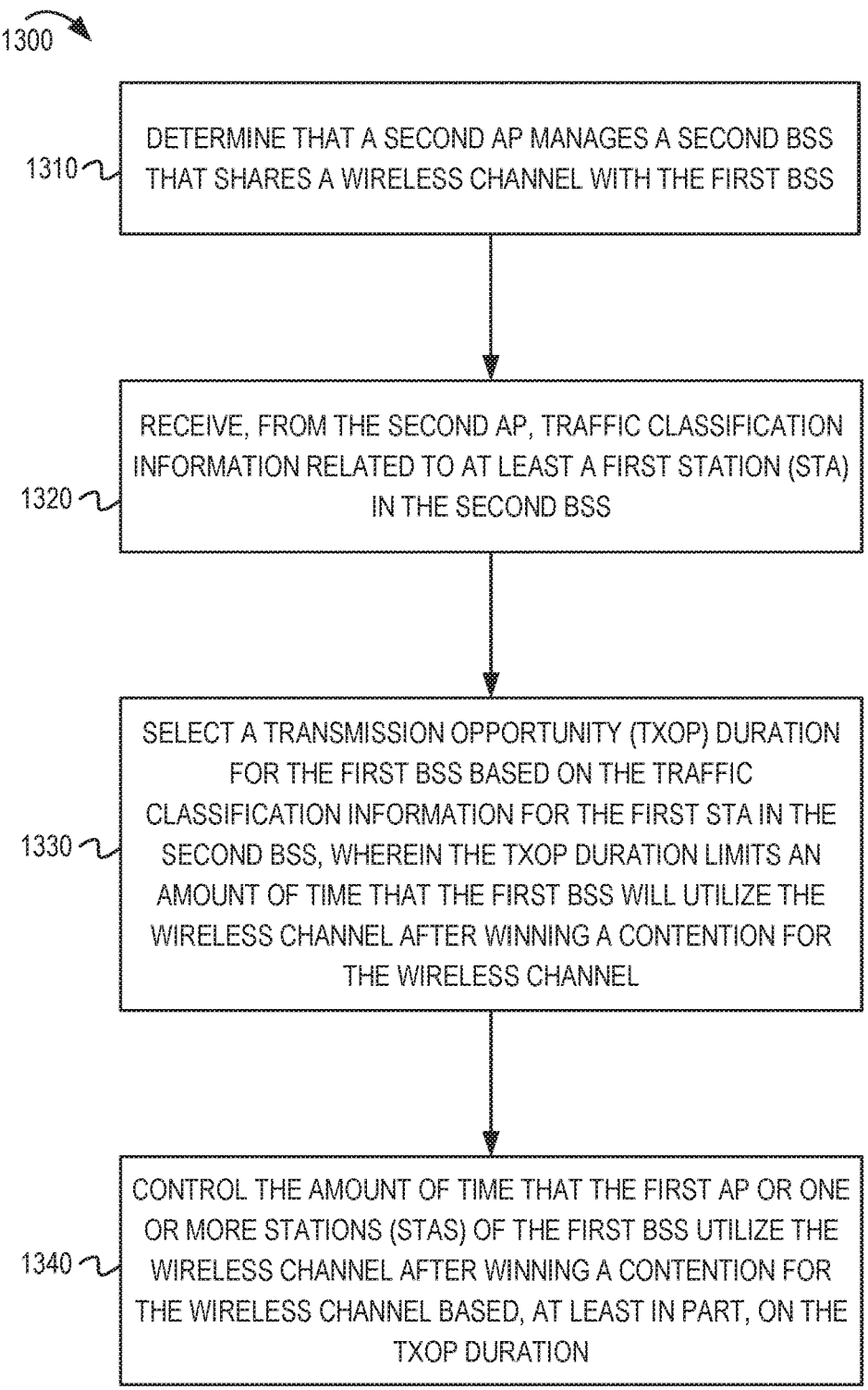
FIG. 13 shows a flowchart illustrating an example process for supporting QoS without a multi-AP controller according to some implementations.

FIG. 13 shows a flowchart illustrating an example process 1300 for supporting QoS without a multi-AP controller according to some implementations. The operations of process 1300 may be implemented by an AP or its components as described herein. For example, the process 1300 may be performed by a wireless communication device such as the wireless communication device 800 described above with reference to FIG. 8. In some implementations, the process 1300 may be performed by a wireless communication device operating as or within an AP, such as one of the APs 102, 110, 120, 130, 140 and 902 described above with reference to FIGS. 1-6 and 9A.

In some implementations, in block 1310, the wireless communication device may determine that a second AP manages a second BSS that shares a wireless channel with the first BSS.

In some implementations, in block 1320, the wireless communication device may receive, from the second AP, traffic classification information related to at least a first station (STA) in the second BSS.

In some implementations, in block 1330, the wireless communication device may select a transmission opportunity (TXOP) duration for the first BSS based on the traffic classification information for the first STA in the second BSS, wherein the TXOP duration limits an amount of time that the first BSS will utilize the wireless channel after winning a contention for the wireless channel.

In some implementations, in block 1340, the wireless communication device may control the amount of time that the first AP or one or more stations (STAs) of the first BSS utilize the wireless channel after winning a contention for the wireless channel based, at least in part, on the TXOP duration.

FIG. 14 shows a flowchart illustrating an example process for setting a BSS configuration policy according to some implementations. The operations of process 1400 may be implemented by a multi-AP controller as described herein. For example, the process 1400 may be performed by a wireless communication device such as the wireless communication device 800 described above with reference to FIG. 8. In some implementations, the process 1400 may be performed by a WLAN device that includes a multi-AP controller, such as the WLAN device 150 described above with reference to FIGS. 5 and 6.

In some implementations, in block 1410, the wireless communication device may receive traffic classification information associated with communications between a first access point (AP) of a multi-AP network and one or more wireless stations (STAs) in a first basic service set (BSS) managed by the first AP.

In some implementations, in block 1420, the wireless communication device may determine a BSS configuration policy for a second BSS managed by a second AP of the multi-AP network based on the traffic classification information.

In some implementations, in block 1430, the wireless communication device may transmit, to the second AP, a first message that indicates the BSS configuration policy.

Figure 15:
FIG. 15 shows a flowchart illustrating an example process for using a BSS configuration policy according to some implementations.

FIG. 15 shows a flowchart illustrating an example process for using a BSS configuration policy according to some implementations. The process 1500 may be performed by a wireless communication device such as the wireless communication device 800 described above with reference to FIG. 8. In some implementations, the process 1500 may be performed by a wireless communication device that has a multi-AP controller. In some implementations, the process 1500 may be performed by a wireless communication device operating as or within an AP, such as one of the APs 102, 110, 120, 130, 140 and 902 described above with reference to FIGS. 1-6 and 9A.

In some implementations, in block 1510, the wireless communication device may receive a first message that indicates a basic service set (BSS) configuration policy for a first BSS managed by the first AP, wherein the BSS configuration policy is based, at least in part, on traffic classification information associated with communications between one or more stations (STAs) in a second BSS managed by a second AP of the multi-AP network.

In some implementations, in block 1520, the wireless communication device may set a BSS configuration setting for the first BSS based, at least in part, on the BSS configuration policy indicated in the first message.

Figure 16:
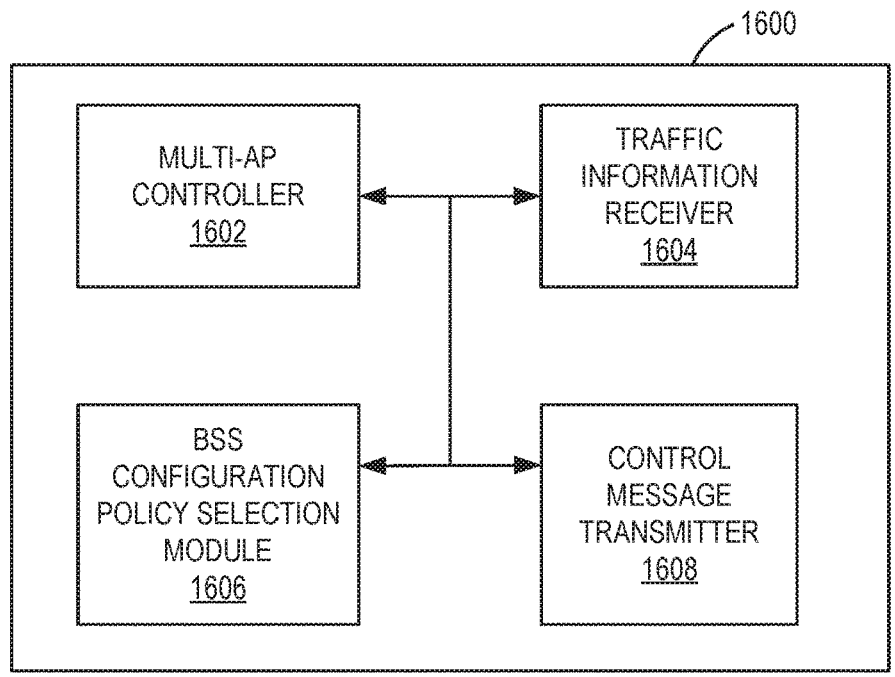
FIG. 16 shows a block diagram of an example wireless communication device according to some implementations.

FIG. 16 shows a block diagram of an example wireless communication device 1600 according to some implementations. In some implementations, the wireless communication device 1600 is configured to perform one or more of the processes 1000, 1100, and 1400 described above with reference to FIGS. 10, 11, and 14, respectively. The wireless communication device 1600 may be an example implementation of the wireless communication device 800 described above with reference to FIG. 8. For example, the wireless communication device 1600 can be a chip, SoC, chipset, package or device that includes at least one processor and at least one modem (for example, a Wi-Fi (IEEE 802.11) modem or a cellular modem). In some implementations, the wireless communication device 1600 can be a device for use in a WLAN device that includes a multi-AP controller, such as the WLAN device 150 described above with reference to FIGS. 5 and 6. In some other implementations, the wireless communication device 1600 can be a WLAN device that includes such a chip, SoC, chipset, package or device as well as at least one transmitter, at least one receiver, and at least one antenna.

The wireless communication device 1600 includes a multi-AP controller 1602, a traffic information receiver 1604, a BSS configuration policy selection module 1606 and a control message transmitter 1608. Portions of one or more of the modules 1602, 1604, 1606 and 1608 may be implemented at least in part in hardware or firmware. For example, the multi-AP controller 1602 may be implemented at least in part by a modem (such as the modem 802). In some implementations, at least some of the modules 1602, 1604, 1606 and 1608 are implemented at least in part as software stored in a memory (such as the memory 808). For example, portions of one or more of the modules 1602, 1604, 1606 and 1608 can be implemented as non-transitory instructions (or "code") executable by a processor (such as the processor 806) to perform the functions or operations of the respective module.

The multi-AP controller 1602 is configured to implement a multi-AP control protocol. For example, the multi-AP controller 1602 may establish a control relationship with one or more APs in a multi-AP network.

The traffic information receiver 1604 is configured to receive report messages from one or more APs (or a multi-AP protocol agent in the one or more APs). For example, the traffic information receiver 1604 may receive neighbor report messages, IEEE 1905 multi-AP protocol messages, or IEEE 802.11k, among other examples.

The BSS configuration policy selection module 1606 is configured to determine a BSS configuration policy (such as a TXOP duration limit) for neighboring BSSs that interfere with any BSS in the path of a type of traffic that has a QoS requirement.

The control message transmitter 1608 is configured to transmit a control message to one or more BSSs that are neighboring BSSs to those BSSs that are carrying latency-sensitive traffic between a gateway and a client STA.

Figure 17:
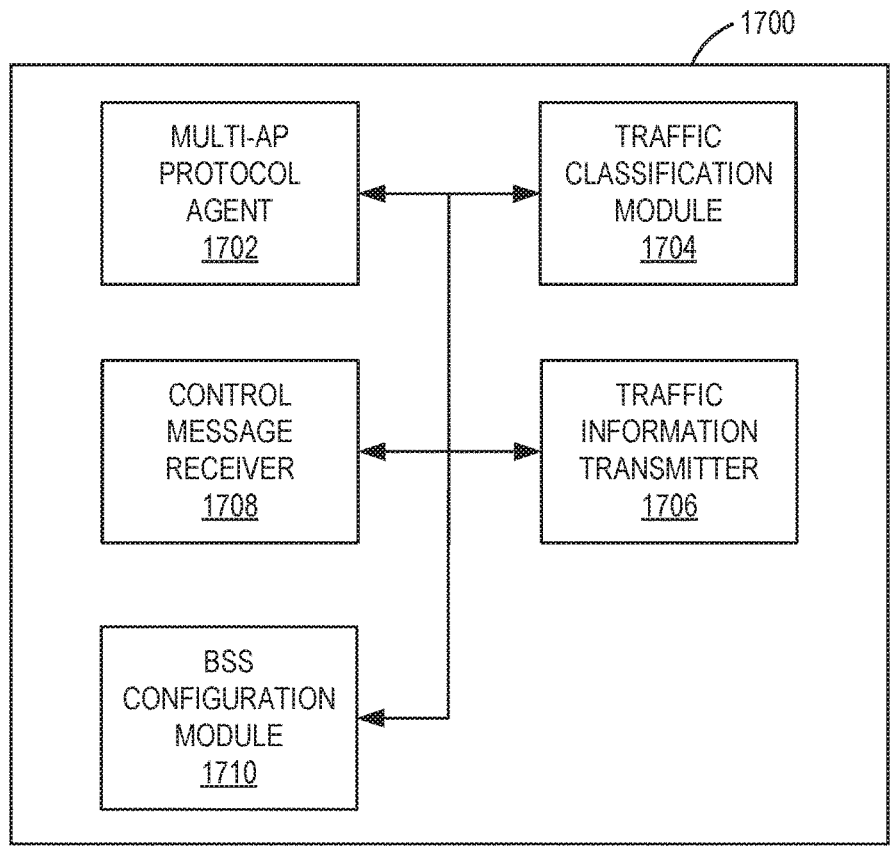
FIG. 17 shows a block diagram of an example wireless communication device according to some implementations.

FIG. 17 shows a block diagram of an example wireless communication device 1700 according to some implementations. In some implementations, the wireless communication device 1700 is configured to perform one or more of the processes 1200, 1300, and 1500 described above with reference to FIGS. 12, 13, and 15, respectively. The wireless communication device 1700 may be an example implementation of the wireless communication device 800 described above with reference to FIG. 8. For example, the wireless communication device 1700 can be a chip, SoC, chipset, package or device that includes at least one processor and at least one modem (for example, a Wi-Fi (IEEE 802.11) modem or a cellular modem). In some implementations, the wireless communication device 1700 can be a device for use in an AP, such as one of the APs 102, 110, 120, 130, 140 and 902 described above with reference to FIGS. 1-6 and 9A. In some other implementations, the wireless communication device 1700 can be an AP that includes such a chip, SoC, chipset, package or device as well as at least one transmitter, at least one receiver, and at least one antenna.

The wireless communication device 1700 includes a multi-AP protocol agent 1702, a traffic classification module 1704, a traffic information transmitter 1706, a control message receiver 1708, and a BSS configuration module 1710. Portions of one or more of the modules 1702, 1704, 1706, 1708 and 1710 may be implemented at least in part in hardware or firmware. For example, the multi-AP protocol agent 1702 may be implemented at least in part by a modem (such as the modem 802). In some implementations, at least some of the modules 1702, 1704, 1706, 1708 and 1710 are implemented at least in part as software stored in a memory (such as the memory 808). For example, portions of one or more of the modules 1702, 1704, 1706, 1708 and 1710 can be implemented as non-transitory instructions (or "code") executable by a processor (such as the processor 806) to perform the functions or operations of the respective module.

The multi-AP protocol agent 1702 is configured to implement a multi-AP control protocol. For example, the multi-AP controller 1402 may establish a control relationship with a multi-AP controller.

The traffic classification module 1704 is configured to determine a type of traffic carried by the wireless communication device 1700.

The traffic information transmitter 1706 is configured to transmit a report message to the multi-AP controller.

The control message receiver 1708 is configured to receive a control message from the multi-AP controller.

The BSS configuration module 1710 is configured to configure BSS parameters of a BSS managed by the wireless communication device 1700. For example, the BSS configuration module 1710 may configure its local settings as well as transmit a configuration message to other devices associated with its BSS.

While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following clauses.

Clause 1. A first aspect for wireless communication by a wireless communication device of a multiple access point (multi-AP) controller, the aspect comprising: establishing a control relationship between the multi-AP controller and a plurality of access points (APs) in a multi-AP network, the plurality of APs including at least a first AP that manages a first basic service set (BSS) and a second AP that manages a second BSS; determining that the first BSS and the second BSS are neighboring BSSs that share a wireless channel; receiving, from the first AP, traffic classification information related to at least a first station (STA) in the first BSS; selecting a transmission opportunity (TXOP) duration for the second BSS based on the traffic classification information for the first STA in the first BSS, wherein the TXOP duration limits an amount of time that the second BSS is permitted to utilize the wireless channel after winning a contention for the wireless channel; and transmitting a control message from the multi-AP controller to the second AP, the control message indicating the TXOP duration for the second BSS.

Clause 2. The aspect of clause 1, wherein determining that the first BSS and the second BSS are neighboring BSSs includes: receiving one or more neighbor AP report messages from the plurality of APs; and determining that the first BSS and the second BSS are neighboring BSSs based, at least in part, on the one or more neighbor AP report messages.

Clause 3. The aspect of clause 2, wherein determining that the first BSS and the second BSS are neighboring BSSs further includes: determining an amount of co-channel interference between that the first BSS and the second BSS based, at least in part, on the one or more neighbor AP report messages; and selecting the TXOP duration based on a determination that the amount of co-channel interference is above a co-channel interference threshold.

Clause 4. The aspect of clause 3, wherein determining the amount of co-channel interference includes: receiving, from the first AP, a received signal strength indication (RSSI) that indicates a signal strength of the second AP as measured by the first AP; and determining the amount of co-channel interference based, at least in part, on the RSSI.

Clause 5. The aspect of any one of clauses 1-4, wherein selecting the TXOP duration for the second BSS includes: determining one or more quality of service (QoS) parameters for the first STA based on the traffic classification information; and determining the TXOP duration for the second BSS to limit the amount of time that the second BSS is permitted to utilize the wireless channel before a subsequent contention for the wireless channel that enables the first BSS to obtain a subsequent TXOP.

Clause 6. The aspect of clause 5, wherein the one or more QoS parameters include a latency value.

Clause 7. The aspect of clause 6, wherein the TXOP duration for the second BSS is proportionally increased or decreased based on the latency value.

Clause 8. The aspect of clause 6, further comprising determining a type of traffic based on the traffic classification information.

Clause 9. The aspect of clause 8, further comprising: determining that the latency value is 75 milliseconds when the type of traffic is one or more of voice over internet protocol (VoIP) traffic, video conferencing traffic, or gaming traffic; and determining that the latency value is 6 seconds when the type of traffic is internet video streaming traffic.

Clause 10. The aspect of any one of clauses 8-9, further comprising determining the one or more QoS parameters based on the type of traffic transmitted or received by the first STA.

Clause 11. The aspect of any one of clauses 5-10, wherein determining the one or more QoS parameters includes processing the traffic classification information using a heuristic rule matching module or a machine learning traffic classifier.

Clause 12. The aspect of any one of clauses 5-10, wherein the traffic classification information includes a user-configurable or network-configurable setting for the first STA.

Clause 13. The aspect of any one of clauses 1-12, further comprising: determining a quantity of neighboring BSSs that share the wireless channel with the first BSS and that have an amount of co-channel interference above a co-channel interference threshold; and selecting the TXOP duration based, at least in part, on the quantity of neighboring BSSs.

Clause 14. The aspect of clause 13, wherein selecting the TXOP duration includes: determining a maximum latency value based on the traffic classification information; and dividing the maximum latency value by a product of the quantity of neighboring BSSs multiplied by a fixed value.

Clause 15. The aspect of any one of clauses 1-14 further comprising: determining that a third AP manages a third BSS is part of a multi-hop path from the first STA to a gateway service of the multi-AP network; and transmitting a second control message from the multi-AP controller to the third AP, the second control message indicating the TXOP duration for the third BSS.

Clause 16. The aspect of clause 15, further comprising: determining that a fourth AP manages a fourth BSS that is a neighboring BSS of the third BSS; determining that an amount of co-channel interference between the fourth BSS and the third BSS is above a co-channel interference threshold; and transmitting a third control message from the multi-AP controller to the fourth AP, the third control message indicating the TXOP duration for the fourth BSS.

Clause 17. The aspect of any one of clauses 1-16, wherein the selection of the TXOP duration for the second BSS includes: calculating a duration limit based on the traffic classification information; and selecting the TXOP duration for the second BSS based on the duration limit being above a duration threshold.

Clause 18. The aspect of clause 17, wherein the duration threshold is 10 milliseconds.

Clause 19. The aspect of any one of clauses 1-18, wherein the control message includes a BSS parameter setting information element.

Clause 20. The aspect of any one of clauses 1-19, further comprising causing the second AP to transmit a TXOP configuration message in the second BSS.

Clause 21. The aspect of any one of clauses 1-20, wherein the multi-AP controller is included in one of the plurality of APs in the multi-AP network.

Clause 22. The aspect of any one of clauses 1-21, wherein the multi-AP controller manages one or more configuration settings of the plurality of APs in accordance with a multi-AP protocol specification that defines the control relationship between the multi-AP controller and respective multi-AP protocol agents in each of the plurality of APs.

Clause 23. An aspect for wireless communication by a wireless communication device of a first access point (AP) that manages a first basic service set (BSS), the aspect comprising: establishing a control relationship between the first AP and a multi-AP controller, wherein the first AP shares a wireless channel with a second AP that manages a second BSS; receiving a control message from the multi-AP controller indicating a TXOP duration for the first BSS; and setting a TXOP duration configuration setting in the first AP based, at least in part, on the TXOP duration indicated in the control message.

Clause 24. The aspect of clause 23, further comprising: controlling an amount of time that the first AP or one or more stations (STAs) of the first BSS utilize the wireless channel after winning a contention for the wireless channel based, at least in part, on the TXOP duration configuration setting.

Clause 25. The aspect of any one of clauses 23-24, further comprising: transmitting the TXOP duration to one or more STAs to limit an amount of time that the one or more STAs utilize the wireless channel after winning a contention for the wireless channel.

Clause 26. The aspect of any one of clauses 23-25, wherein establishing the control relationship includes implementing, using a multi-AP protocol agent in the first AP, a multi-AP protocol specification that defines the control relationship between the multi-AP protocol agent and the multi-AP controller.

Clause 27. An aspect for wireless communication by a wireless communication device of a first access point (AP) that manages a first basic service set (BSS), the aspect comprising: determining that a second AP manages a second BSS that shares a wireless channel with the first BSS;

receiving, from the second AP, traffic classification information related to at least a first station (STA) in the second BSS; selecting a transmission opportunity (TXOP) duration for the first BSS based on the traffic classification information for the first STA in the second BSS, wherein the TXOP duration limits an amount of time that the first BSS will utilize the wireless channel after winning a contention for the wireless channel; and controlling the amount of time that the first AP or one or more stations (STAs) of the first BSS utilize the wireless channel after winning a contention for the wireless channel based, at least in part, on the TXOP duration.

Clause 28. The aspect of clause 27, further comprising: transmitting the TXOP duration to one or more STAs in the first BSS to limit an amount of time that the one or more STAs utilize the wireless channel after winning a contention for the wireless channel.

Clause 29. The aspect of any one of clauses 27-28, further comprising: receiving one or more neighbor AP report messages from the second AP; and determining that the first BSS and the second BSS are neighboring BSSs based, at least in part, on the one or more neighbor AP report messages.

Clause 30. The aspect of any one of clauses 27-29, further comprising: determining an amount of co-channel interference between that the first BSS and the second BSS; and selecting the TXOP duration for the first BSS based on a determination that the amount of co-channel interference is above a co-channel interference threshold.

Clause 31. The aspect of clause 30, wherein determining the amount of co-channel interference includes: determining a received signal strength indication (RSSI) that indicates a signal strength of the second AP as measured by the first AP; and determining the amount of co-channel interference based, at least in part, on the RSSI.

Clause 32. The aspect of any one of clauses 27-31, wherein selecting the TXOP duration for the first BSS includes: determining one or more quality of service (QoS) parameters for the first STA based on the traffic classification information; and selecting the TXOP duration for the first BSS to limit the amount of time that the first BSS will utilize the wireless channel before a subsequent contention for the wireless channel, the subsequent contention that enables the second BSS to obtain a subsequent TXOP.

Clause 33. The aspect of clause 32, wherein the one or more QoS parameters include a latency value.

Clause 34. The aspect of clause 33, wherein the TXOP duration for the first BSS is proportionally increased or decreased based on the latency value.

Clause 35. The aspect of clause 33, further comprising determining a type of traffic based on the traffic classification information.

Clause 36. The aspect of clause 35, further comprising determining that the latency value is 75 milliseconds when the type of traffic is one or more of voice over internet protocol (VoIP) traffic, video conferencing traffic, or gaming traffic; and determining that the latency value is 6 seconds when the type of traffic is internet video streaming traffic.

Clause 37. The aspect of any one of clauses 35-36, further comprising determining the one or more QoS parameters based on the type of traffic transmitted or received by the first STA in the second BSS.

Clause 38. The aspect of any one of clauses 27-37, further comprising: determining a quantity of neighboring BSSs that share the wireless channel with the first BSS and that have an amount of co-channel interference above a co-channel interference threshold; and selecting the TXOP duration based, at least in part, on the quantity of neighboring BSSs.

Clause 39. The aspect of clause 38, wherein determining the TXOP duration includes: determining a maximum latency value based on the traffic classification information; and dividing the maximum latency value by a product of the quantity of neighboring BSSs multiplied by a fixed value.

Clause 40. The aspect of any one of clauses 27-39, further comprising transmitting a control message from the first AP to the second AP, the control message indicating the TXOP duration for the first BSS.

Clause 41. The aspect of clause 40, wherein the control message includes a BSS parameter setting information element.

Clause 42. The aspect of any one of clauses 27-41, further comprising transmitting, from the first AP to the second AP, second traffic classification information regarding a second STA in the first BSS.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a multiple access point (multi-AP) controller, comprising:
    receiving traffic classification information associated with communications between a first access point (AP) of a multi-AP network and one or more wireless stations (STAs) in a first basic service set (BSS) managed by the first AP;
    determining a BSS configuration policy for a second BSS managed by a second AP of the multi-AP network based on the traffic classification information; and
    transmitting, to the second AP, a first message that indicates the BSS configuration policy.

2. The method of claim 1, further comprising:
    determining a type of traffic being transmitted or received by the one or more STAs in the first BSS based on the traffic classification information; and
    determining the BSS configuration policy based, at least in part, on the type of traffic.

3. The method of claim 1, further comprising:
    determining that the first BSS and the second BSS utilize a same wireless channel;
    wherein determining the BSS configuration policy includes selecting a maximum transmission opportunity (TXOP) duration for the BSS configuration policy based on the traffic classification information for the one or more STAs in the first BSS, and wherein the maximum TXOP duration limits an amount of time that the second BSS is permitted to utilize the wireless channel after winning a contention for the wireless channel.

4. The method of claim 1, further comprising:
    receiving one or more neighbor AP report messages from a plurality of APs of the multi-AP network;
    determining that the first BSS and the second BSS are neighboring BSSs based, at least in part, on the one or more neighbor AP report messages; and
    determining the BSS configuration policy when the first BSS and second BSs are neighboring BSSs.

5. The method of claim 4, further comprising:
    determining a quantity of neighboring BSSs, including the first BSS and the second BSS, that have co-channel interference based on the one or more neighbor AP report messages; and
    determining the BSS configuration policy based, at least in part, on the quantity of neighboring BSSs.

6. The method of claim 4, further comprising:
    determining an amount of co-channel interference between that the first BSS and the second BSS based, at least in part, on the one or more neighbor AP report messages; and
    determining the BSS configuration policy based on the amount of co-channel interference.

7. The method of claim 6, wherein determining the amount of co-channel interference includes:
    receiving, from the first AP, a received signal strength indication (RSSI) that indicates a signal strength of the second AP as measured by the first AP; and
    determining the amount of co-channel interference based, at least in part, on the RSSI.

8. The method of claim 6, further comprising:
    determining whether the amount of co-channel interference is above a co-channel interference threshold; and
    determining the BSS configuration policy for the second BSS when the amount of co-channel interference is above the co-channel interference threshold.

9. The method of claim 1, wherein the traffic classification information includes at least one member selected from a group consisting of a latency quality-of-service (QoS) requirement, a traffic type, a service identifier, a traffic timing pattern, a user-configurable QoS setting, and a network-configurable QoS setting.

10. The method of claim 1, wherein determining the BSS configuration policy for the second BSS includes:
    determining one or more quality of service (QoS) parameters for the one or more STAs in the first BSS based on the traffic classification information; and
    determining the BSS configuration policy for the second BSS based on the one or more QoS parameters for the one or more STAs in the first BSS, wherein the BSS configuration policy limits an amount of time that the second BSS is permitted to utilize a wireless channel before the second BSS has to contend for access to the wireless channel such that the first BSS has an opportunity to win a subsequent contention for the wireless channel to satisfy the one or more QoS parameters.

11. The method of claim 10, wherein the one or more QoS parameters include a latency value, and wherein the BSS configuration policy includes a maximum transmission opportunity (TXOP) duration for the second BSS based on the latency value.

12. The method of claim 11,
    wherein the maximum TXOP duration for the BSS configuration policy of the second BSS is a first value when a type of traffic of the one or more STAs in the first BSS includes one or more of voice over internet protocol (VoIP) traffic, video conferencing traffic, or gaming traffic; and
    wherein the maximum TXOP duration is a second value when the type of traffic is internet video streaming traffic.

13. The method of claim 1, wherein determining the BSS configuration policy for the second BSS based on the traffic classification information for the one or more STAs in the first BSS includes:
    adapting one or more settings of the BSS configuration policy using a machine learning algorithm that balances airtime for the first BSS and the second BSS based on traffic classification information associated with the first BSS and the second BSS, respectively.

14. The method of claim 1, further comprising:
    determining that a third AP manages a third BSS that is part of a multi-hop wireless path between the one or more STAs in the first BSS and another device; and
    transmitting a second message to the third AP that indicates a BSS configuration policy for the third BSS.

15. The method of claim 1, wherein transmitting the BSS configuration policy to the second AP causes the second AP to set one or more contention-based access parameters of a BSS configuration for the second BSS based on the BSS configuration policy.

16. The method of claim 1, wherein the multi-AP controller is included in, or part of, an AP of the multi-AP network.

17. The method of claim 1, further comprising managing BSS configuration policies for a plurality of APs of the multi-AP network in accordance with a multi-AP protocol specification that defines a control relationship between the multi-AP controller and respective multi-AP protocol agents in each of the plurality of APs.

18. The method of claim 1, wherein the first message is formatted as an Institute of Electrical and Electronics Engineers (IEEE) 1905 message structured to include the BSS configuration policy in accordance with a multi-AP protocol specification.

19. A method for wireless communication by a first access point (AP) of a multi-AP network, comprising:
receiving a first message that indicates a basic service set (BSS) configuration policy for a first BSS managed by the first AP, wherein the BSS configuration policy is based, at least in part, on traffic classification information associated with communications between one or more stations (STAs) in a second BSS managed by a second AP of the multi-AP network; and
setting a BSS configuration setting for the first BSS based, at least in part, on the BSS configuration policy indicated in the first message.

20. The method of claim 19, wherein the BSS configuration policy indicates a maximum transmission opportunity (TXOP) duration, and wherein the maximum TXOP duration limits an amount of time that the first AP or one or more STAs in the first BSS is permitted to utilize a wireless channel after winning a contention for the wireless channel.

21. The method of claim 20, further comprising:
controlling an amount of time that the first AP or one or more stations (STAs) in the first BSS utilize the wireless channel after winning a contention for the wireless channel based, at least in part, on the maximum TXOP duration.

22. The method of claim 19, further comprising implementing a multi-AP protocol agent in accordance with a multi-AP protocol specification that defines a control relationship between the multi-AP protocol agent and a multi-AP controller of the multi-AP network, wherein the first message is received from the multi-AP controller.

23. The method of claim 19, further comprising:
receiving, from the second AP, traffic classification information related to the one or more STAs in the second BSS;
selecting a BSS configuration setting for the first BSS based on the BSS configuration policy and the traffic classification information for the one or more STAs in the second BSS; and
controlling an amount of time that the first AP or one or more stations (STAs) of the first BSS utilize a wireless channel after winning a contention for the wireless channel based, at least in part, on the BSS configuration setting.

24. The method of claim 23, further comprising:
determining an amount of co-channel interference between that the first BSS and the second BSS; and
selecting the BSS configuration setting for the first BSS based on a determination that the amount of co-channel interference is above a co-channel interference threshold.

25. A wireless communication device of a multiple access point (multi-AP) controller, the wireless communication device comprising:
at least one modem configured to receive traffic classification information associated with communications between a first access point (AP) of a multi-AP network and one or more wireless stations (STAs) in a first basic service set (BSS) managed by the first AP; and
at least one processor configured to determine a BSS configuration policy for a second BSS managed by a second AP of the multi-AP network based on the traffic classification information; and the at least one modem configured to transmit, to the second AP, a first message that indicates the BSS configuration policy.

26. The wireless communication device of claim 25, wherein the at least one processor is further configured to:
determine that the first BSS and the second BSS utilize a same wireless channel; and
select a transmission opportunity (TXOP) duration for the BSS configuration policy based on the traffic classification information for the first STA in the first BSS, and wherein the TXOP duration limits an amount of time that the second BSS is permitted to utilize the wireless channel after winning a contention for the wireless channel.

27. The wireless communication device of claim 25, wherein the at least one modem is configured to receive one or more neighbor AP report messages from a plurality of APs of the multi-AP network; and
wherein the at least one processor is further configured to:
determine an amount of co-channel interference between that the first BSS and the second BSS based, at least in part, on the one or more neighbor AP report messages; and
determine the BSS configuration policy for the second BSS when the amount of co-channel interference is above a co-channel interference threshold.

28. An apparatus of a first access point (AP) of a multi-AP network, the apparatus comprising:
at least one modem configured to receive a first message that indicates a basic service set (BSS) configuration policy for a first BSS managed by the first AP, wherein the BSS configuration policy is based, at least in part, on traffic classification information associated with communications between one or more stations (STAs) in a second BSS managed by a second AP of the multi-AP network; and
at least one processor configured to set a BSS configuration setting for the first BSS based, at least in part, on the BSS configuration policy indicated in the first message.

29. The apparatus of claim 28, wherein the BSS configuration policy includes a maximum transmission opportunity (TXOP) duration, and wherein the maximum TXOP duration limits an amount of time that the first BSS is permitted to utilize a wireless channel after winning a contention for the wireless channel.

30. The apparatus of claim 28, further comprising:
at least one transceiver coupled to the at least one modem;
at least one antenna coupled to the at least one transceiver to wirelessly transmit signals output from the at least one transceiver and to wirelessly receive signals for input into the at least one transceiver; and
a housing that encompasses the at least one modem, the at least one processor, the at least one transceiver and at least a portion of the at least one antenna.

* * * * *